US008243236B2

(12) United States Patent
Hara et al.

(10) Patent No.: US 8,243,236 B2
(45) Date of Patent: Aug. 14, 2012

(54) LIQUID CRYSTAL DISPLAY AND METHOD FOR MANUFACTURING LIQUID CRYSTAL DISPLAY

(75) Inventors: Yoshihito Hara, Osaka (JP); Tetsuo Kikuchi, Osaka (JP); Hideki Kitagawa, Osaka (JP); Hajime Imai, Osaka (JP); Mitsunori Imade, Osaka (JP); Junya Shimada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 523 days.

(21) Appl. No.: 12/446,071

(22) PCT Filed: Sep. 7, 2007

(86) PCT No.: PCT/JP2007/067511
§ 371 (c)(1),
(2), (4) Date: Apr. 17, 2009

(87) PCT Pub. No.: WO2008/047517
PCT Pub. Date: Apr. 24, 2008

(65) Prior Publication Data
US 2010/0315578 A1    Dec. 16, 2010

(30) Foreign Application Priority Data

Oct. 18, 2006    (JP) ................................ 2006-284206

(51) Int. Cl.
*G02F 1/1335*    (2006.01)
(52) U.S. Cl. ......................................................... 349/113
(58) Field of Classification Search .................... None
See application file for complete search history.

(56) References Cited

U.S. PATENT DOCUMENTS

| | | | |
|---|---|---|---|
| 4,345,249 A | 8/1982 | Togashi | |
| 4,519,678 A | 5/1985 | Komatsubara et al. | |
| 4,889,412 A | 12/1989 | Clerc et al. | |
| 5,408,345 A * | 4/1995 | Mitsui et al. | 349/42 |
| 5,418,635 A * | 5/1995 | Mitsui et al. | 349/113 |
| 5,508,834 A | 4/1996 | Yamada et al. | |

(Continued)

FOREIGN PATENT DOCUMENTS

CN      1544985 A    11/2004

(Continued)

OTHER PUBLICATIONS

International Search Report for PCT/JP2007/067511, mailed Oct. 9, 2007.

(Continued)

*Primary Examiner* — Mike Stahl
(74) *Attorney, Agent, or Firm* — Nixon & Vanderhye P.C.

(57) ABSTRACT

A transflective-type and a reflection-type liquid crystal display device having a high reflection efficiency and a high image quality are provided. A liquid crystal display device of the present invention is a liquid crystal display device including a reflection region for reflecting incident light toward a display surface, wherein the reflection region includes a metal layer, an insulating layer formed on the metal layer, a semiconductor layer formed on the insulating layer, and a reflective layer formed on the semiconductor layer; a plurality of recesses are formed in at least one of the metal layer, the insulating layer and the semiconductor layer; a plurality of dents are formed in the reflective layer in the reflection region according to the plurality of recesses; and a shortest distance a between edge portions of at least two of the plurality of recesses is 4 μm or less.

10 Claims, 14 Drawing Sheets

U.S. PATENT DOCUMENTS

| | | |
|---|---|---|
| 5,666,179 A | 9/1997 | Koma |
| 5,811,835 A | 9/1998 | Seiki et al. |
| 6,031,591 A | 2/2000 | Hamanaka |
| 6,069,740 A | 5/2000 | Hamanaka |
| 6,129,439 A | 10/2000 | Hou et al. |
| 6,195,140 B1 | 2/2001 | Kubo et al. |
| 6,208,395 B1 | 3/2001 | Kanoh et al. |
| 6,287,899 B1 | 9/2001 | Park et al. |
| 6,330,047 B1 | 12/2001 | Kubo et al. |
| 6,340,998 B1 | 1/2002 | Kim et al. |
| 6,384,889 B1 | 5/2002 | Miyachi et al. |
| 6,407,784 B1 * | 6/2002 | Kanou et al. ............ 349/113 |
| 6,468,822 B2 | 10/2002 | Maeda et al. |
| 6,573,127 B2 | 6/2003 | Seo |
| 6,661,488 B1 | 12/2003 | Takeda et al. |
| 6,710,825 B2 | 3/2004 | Kubo et al. |
| 6,717,642 B2 | 4/2004 | Sasaki et al. |
| 6,747,289 B2 * | 6/2004 | Yamazaki et al. ............ 257/59 |
| 6,771,346 B2 | 8/2004 | Sugimoto et al. |
| 6,784,961 B2 | 8/2004 | Suzuki et al. |
| 6,788,375 B2 | 9/2004 | Ogishima et al. |
| 6,829,026 B2 | 12/2004 | Sasaki et al. |
| 6,839,107 B2 | 1/2005 | Kobashi |
| 6,839,108 B1 | 1/2005 | Hirakata et al. |
| 6,862,062 B2 | 3/2005 | Kubo et al. |
| 6,894,840 B2 | 5/2005 | Yamanaka et al. |
| 6,907,183 B1 | 6/2005 | Yoshida et al. |
| 6,924,876 B2 | 8/2005 | Kubo et al. |
| 6,950,160 B2 | 9/2005 | Kubo et al. |
| 6,965,422 B2 | 11/2005 | Kubo et al. |
| 6,989,874 B2 | 1/2006 | Chae |
| 6,992,718 B1 | 1/2006 | Takahara |
| 6,995,826 B2 | 2/2006 | Kubo et al. |
| 7,084,943 B2 | 8/2006 | Kubo et al. |
| 7,102,712 B2 * | 9/2006 | Anno et al. ............ 349/113 |
| 7,139,055 B2 | 11/2006 | Ogishima et al. |
| 7,145,624 B2 | 12/2006 | Kubo et al. |
| 7,202,923 B2 | 4/2007 | Yamabuchi et al. |
| 7,215,395 B2 | 5/2007 | Kubo et al. |
| 7,230,664 B2 | 6/2007 | Kubo et al. |
| 7,292,300 B2 | 11/2007 | Kubo et al. |
| 7,375,781 B2 | 5/2008 | Kubo |
| 7,379,137 B2 | 5/2008 | Kubo |
| 7,554,631 B2 * | 6/2009 | Tashiro et al. ............ 349/113 |
| 7,768,603 B2 * | 8/2010 | Tasaka et al. ............ 349/113 |
| 2001/0033353 A1 | 10/2001 | Shimoshikiryo |
| 2002/0018161 A1 | 2/2002 | Yamanaka et al. |
| 2002/0022364 A1 | 2/2002 | Hatta et al. |
| 2002/0036740 A1 | 3/2002 | Kubo et al. |
| 2002/0054259 A1 | 5/2002 | Funahata et al. |
| 2002/0054269 A1 | 5/2002 | Maeda et al. |
| 2002/0075436 A1 | 6/2002 | Kubo et al. |
| 2002/0080320 A1 | 6/2002 | Suzuki et al. |
| 2002/0191128 A1 | 12/2002 | Okumura et al. |
| 2003/0089949 A1 | 5/2003 | Lin et al. |
| 2003/0112213 A1 | 6/2003 | Noguchi et al. |
| 2003/0123005 A1 * | 7/2003 | Liu et al. ............ 349/129 |
| 2003/0142255 A1 | 7/2003 | Ishii et al. |
| 2003/0227429 A1 | 12/2003 | Shimoshikiryo |
| 2003/0231267 A1 | 12/2003 | Murai et al. |
| 2004/0027702 A1 | 2/2004 | Matsushita et al. |
| 2004/0070714 A1 | 4/2004 | Ishii et al. |
| 2004/0135949 A1 | 7/2004 | Maeda |
| 2005/0041186 A1 | 2/2005 | Shimoshikiryo |
| 2005/0056127 A1 | 3/2005 | Yamabuchi et al. |
| 2005/0122452 A1 | 6/2005 | Yoshida et al. |
| 2005/0140876 A1 | 6/2005 | Kubo |
| 2005/0168674 A1 | 8/2005 | Kubo |
| 2005/0190322 A1 | 9/2005 | Okabe et al. |
| 2005/0205870 A1 | 9/2005 | Yamazaki |
| 2005/0237463 A1 | 10/2005 | Kubo |
| 2005/0270447 A1 | 12/2005 | Tasaka et al. |
| 2006/0055852 A1 | 3/2006 | Yoshida et al. |
| 2006/0119776 A1 | 6/2006 | Kubo et al. |
| 2006/0158574 A1 | 7/2006 | Kubo et al. |
| 2006/0278874 A1 | 12/2006 | Kubo et al. |
| 2006/0291065 A1 | 12/2006 | Hasei et al. |
| 2007/0001171 A1 | 1/2007 | Yamazaki |
| 2007/0019132 A1 | 1/2007 | Kim et al. |
| 2007/0097293 A1 | 5/2007 | Nakanishi et al. |
| 2007/0139594 A1 | 6/2007 | Kubo et al. |
| 2007/0199504 A1 | 8/2007 | Nakamura et al. |
| 2007/0216827 A1 | 9/2007 | Okada et al. |
| 2007/0291200 A1 | 12/2007 | Tashiro et al. |
| 2008/0266499 A1 | 10/2008 | Kubo |
| 2009/0284683 A1 | 11/2009 | Usukura et al. |
| 2010/0007815 A1 | 1/2010 | Kosegawa et al. |
| 2010/0014031 A1 | 1/2010 | Kikuchi et al. |
| 2010/0020263 A1 | 1/2010 | Murao et al. |
| 2010/0039583 A1 | 2/2010 | Usukura |
| 2010/0053517 A1 | 3/2010 | Imai et al. |
| 2010/0060813 A1 | 3/2010 | Kawashima et al. |
| 2010/0110352 A1 | 5/2010 | Saitoh et al. |
| 2010/0118227 A1 | 5/2010 | Shibata et al. |
| 2010/0118238 A1 | 5/2010 | Shimada et al. |
| 2010/0157213 A1 | 6/2010 | Kubo |
| 2010/0182527 A1 | 7/2010 | Kikuchi et al. |
| 2010/0315578 A1 | 12/2010 | Hara et al. |

FOREIGN PATENT DOCUMENTS

| | | |
|---|---|---|
| EP | 0 645 661 A1 | 3/1995 |
| EP | 1 701 202 A1 | 9/2006 |
| EP | 1 744 204 A1 | 1/2007 |
| JP | 63-21907 B2 | 5/1988 |
| JP | 63-296004 | 12/1988 |
| JP | 02-149802 | 6/1990 |
| JP | 4-372934 | 12/1992 |
| JP | 05-188364 | 7/1993 |
| JP | 5-333328 | 12/1993 |
| JP | 06-034966 | 2/1994 |
| JP | 6-331831 | 12/1994 |
| JP | 07-027913 | 1/1995 |
| JP | 08-148254 | 6/1996 |
| JP | 8-190089 | 7/1996 |
| JP | 9-54318 A | 2/1997 |
| JP | 10-325953 | 12/1998 |
| JP | 11-095197 | 4/1999 |
| JP | 11-109390 | 4/1999 |
| JP | 11-237625 A | 8/1999 |
| JP | 11-242225 A | 9/1999 |
| JP | 11-295697 | 10/1999 |
| JP | 11-337961 | 12/1999 |
| JP | 2000-010124 | 1/2000 |
| JP | 2000-208773 A | 7/2000 |
| JP | 2000-249807 | 9/2000 |
| JP | 2000-329906 | 11/2000 |
| JP | 2001-021862 A | 1/2001 |
| JP | 2001-201619 | 7/2001 |
| JP | 2001-337323 | 12/2001 |
| JP | 2002-236283 | 8/2002 |
| JP | 2003-035824 | 2/2003 |
| JP | 2003-43525 A | 2/2003 |
| JP | 2003-270636 | 9/2003 |
| JP | 2003-280548 | 10/2003 |
| JP | 2003-297850 A | 10/2003 |
| JP | 2003-315803 | 11/2003 |
| JP | 2003-337207 | 11/2003 |
| JP | 2004-258366 | 9/2004 |
| JP | 2004-264653 | 9/2004 |
| JP | 2004-325503 | 11/2004 |
| JP | 2005-128082 | 5/2005 |
| JP | 2005-157105 A | 6/2005 |
| JP | 2005-195733 | 7/2005 |
| JP | 2005-208553 | 8/2005 |
| JP | 2005-221639 | 8/2005 |
| JP | 2005-266370 | 9/2005 |
| JP | 2005-313638 | 11/2005 |
| JP | 2006-091229 | 4/2006 |
| JP | 2006-098525 A | 4/2006 |
| JP | 2006-184673 | 7/2006 |
| JP | 2006-220711 | 8/2006 |
| JP | 2006-220922 | 8/2006 |
| JP | 2006-293410 | 10/2006 |
| JP | 2007-101843 | 4/2007 |
| JP | 2007-133037 | 5/2007 |
| JP | 2007-329099 | 12/2007 |

| | | | |
|---|---|---|---|
| JP | 2008-242307 A | 10/2008 | |
| KR | 2003-058012 A | 7/2003 | |
| KR | 2003-058140 A | 7/2003 | |

OTHER PUBLICATIONS

U.S. Appl. No. 12/299,138, Imai al., filed Oct. 31, 2008.
U.S. Appl. No. 12/299,154, Kikuchi et al., filed Oct. 31, 2008.
U.S. Appl. No. 12/306,959, Hara, filed Dec. 30, 2008.
U.S. Appl. No. 12/666,461, filed Dec. 23, 2009, entitled "Liquid Crystal Display Device and Method of Manufacturing Liquid Crystal Display Device".
U.S. Appl. No. 12/446,099, filed Apr. 17, 2009, entitled "Liquid Crystal Display Device and Method of Manufacturing Liquid Crystal Display Device".
U.S. Appl. No. 12/664,983, filed Dec. 16, 2009, entitled "Liquid Crystal Display Device".
English translation of International Preliminary Report on Patentability mailed Apr. 30, 2009 in corresponding PCT Application No. PCT/JP2007/067511.
EP Supplementary Search Report mailed Dec. 29, 2009 in EP application 07806137.1.
EP Supplementary Search Report mailed Dec. 17, 2009 in EP application 07791179.0.
Kubo et al., "Development of High-Performance ASV-LCDs Using Continuous Pinwheel Alignment (CPA) Mode", pp. 1-5, Jun. 7, 2001.
Suqita et al, "Brightness Enhancement in Transflective LCD by Concentration of Uniaxially Collimated Light with a Micro-Lenticular Lens", , IDW 2007, pp. 1515-1518.
Funamoto et al, "Prism-Sheetless High Bright Back0light System for Mobile Phone", *IDW'04*, pp. 687-690.
Kalantar, "Viewing Angle Control Using Optical Microstructures on Light-Guide Plate for Illumination System of Mobile Transmissive LCD Module", *IDW'02*, pp. 549-552.
KR Notice of Reasons for Rejection and English translation thereof mailed Apr. 25, 2006 in corresponding Korean application No. 10-2004-0110955.
English translation of the International Preliminary Report on Patentability mailed Feb. 14, 2008 in corresponding PCT Application No. PCT/JP2006/315142.
International Search Report for PCT/JP2006/315142 mailed Aug. 22, 2006.
Supplementary EP Search Report mailed Sep. 23, 2010 in corresponding EP application 07806943.2.
Notice of Allowance mailed Nov. 1, 2011 for U.S. Appl. No. 12/440,791; Usukura.
U.S. Notice of Allowance mailed Mar. 23, 2011 in U.S. Appl. No. 12/446,099.
International Search Report for PCT/JP2007/070160, mailed Nov. 27, 2007.
English translation of the International Preliminary Report on Patentability mailed Jun. 25, 2009 in PCT Application No. PCT/JP2007/070829.
U.S. Office Action mailed Aug. 5, 2011 in U.S. Appl. No. 12/518,719.
Restriction Requirement mailed Jun. 2, 2011 in U.S. Appl. No. 12/518,719.
English translation of the International Preliminary Report on Patentability mailed Aug. 6, 2009 in PCT Application No. PCT/JP2007/073557.
International Search Report for PCT/JP2007/073557, mailed Jan. 15, 2008.
International Search Report for PCT/JP2007/070829, mailed Nov. 27, 2007.
International Search Report mailed Jan. 29, 2008 in PCT application PCT/JP 2007/073787.
International Search Report mailed Apr. 8, 2008 in PCT application PCT/JP/2007/075147.
English translation of the International Preliminary Report on Patentability mailed Aug. 13, 2009 in PCT Application No. PCT/JP2007/073787.
English International Preliminary Report on Patentability mailed Jan. 21, 2010 in PCT Application No. PCT/JP2008/001353.
English International Preliminary Report on Patentability mailed Oct. 22, 2009 in PCT Application No. PCT/JP2007/075147.
Supplementary EP Search Report mailed Dec. 17, 2010 in EP application 07860369.3.
Supplementary EP Search Report mailed Mar. 3, 2010 in EP application 07850173.1.
English International Preliminary Report on Patentability mailed Nov. 27, 2008 in PCT Application No. PCT/JP2007/057674.
International Search Report mailed Jul. 3, 2007 in PCT application PCT/JP2007/057674.
International Search Report mailed Jul. 3, 2007 in PCT application PCT/JP2007/057675.
English International Preliminary Report on Patentability mailed Nov. 27, 2008 in PCT Application No. PCT/JP2007/057675.
English translation of International Preliminary Report on Patentability mailed Apr. 30, 2009 in corresponding PCT Application No. PCT/JP2007/070160.
International Search Report mailed Aug. 21, 2007 in PCT application PCT/JP 2007/061632.
English International Preliminary Report on Patentability mailed Jan. 29, 2009 in PCT Application No. PCT/JP2007/061632.
International Search Report mailed Jul. 8, 2008 in PCT application PCT/JP2008/001353.

* cited by examiner

FIG.2
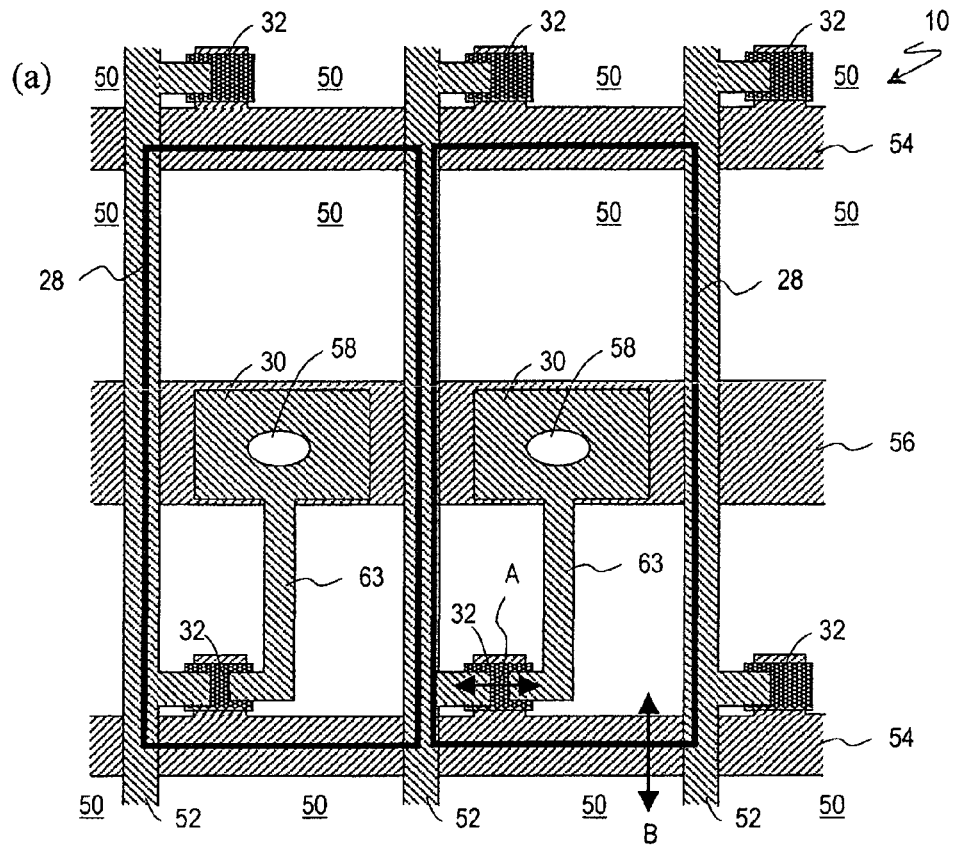
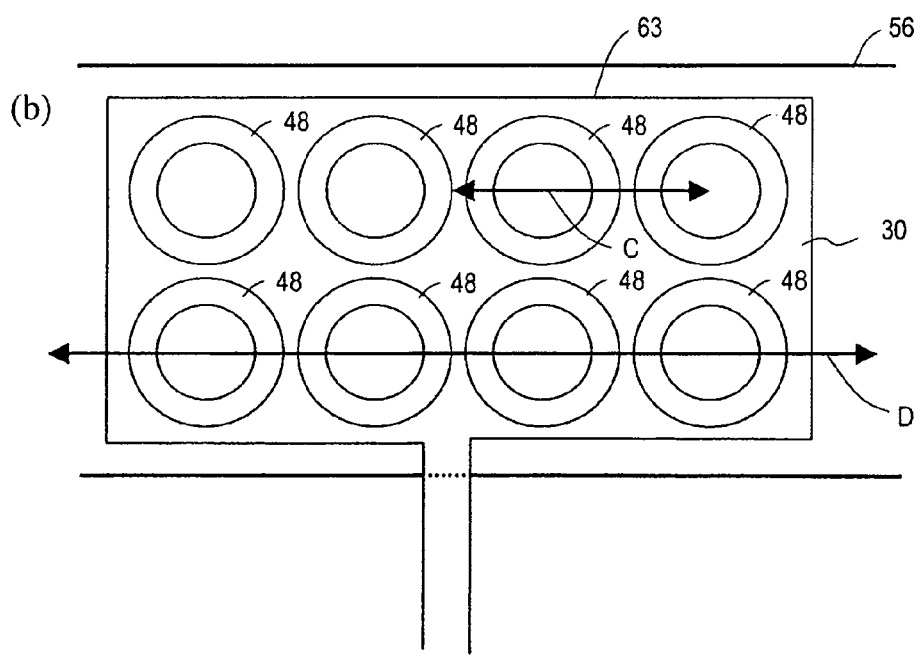

FIG.3
(a)
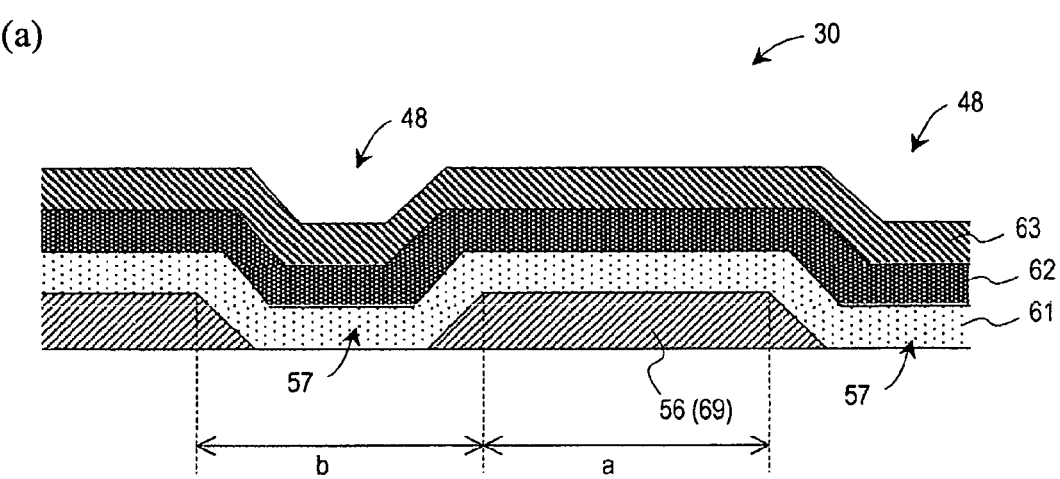
(b)
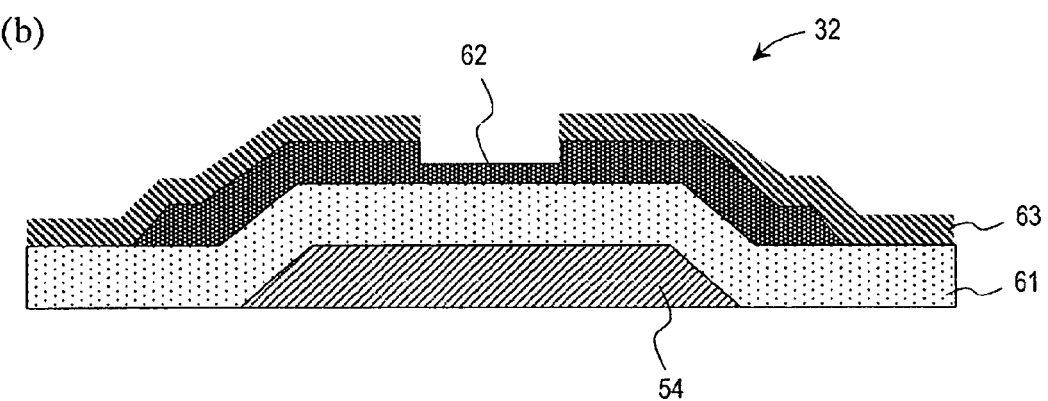

FIG.5
(a)
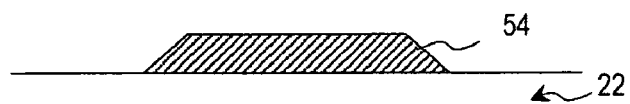
(b)
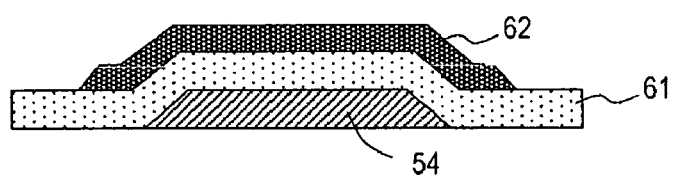
(c)
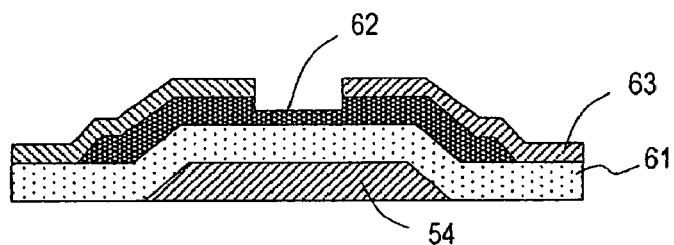
(d)
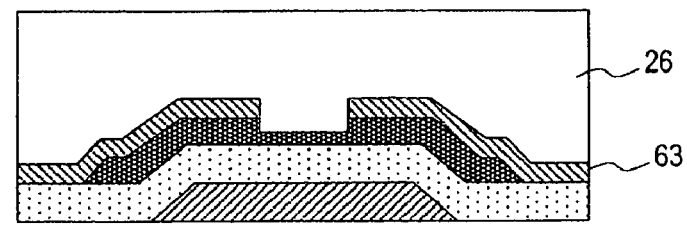
(e)
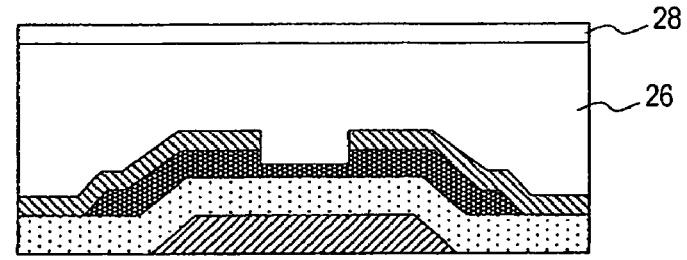

FIG. 7
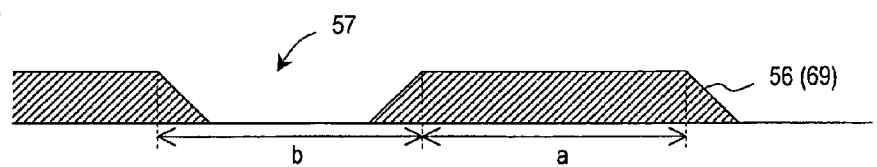
(a)
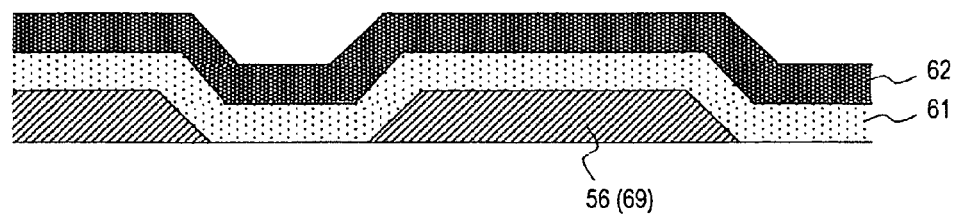
(b)
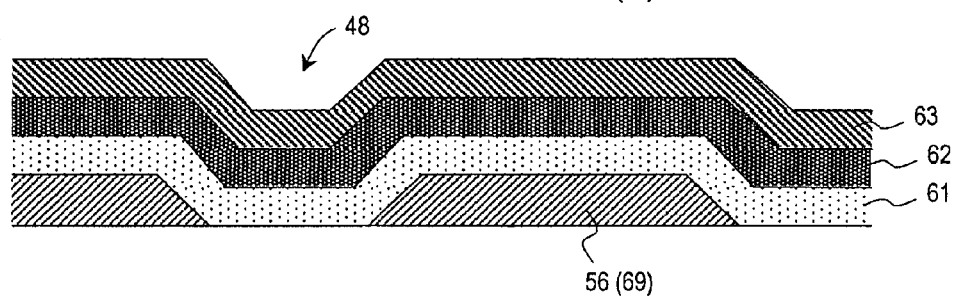
(c)
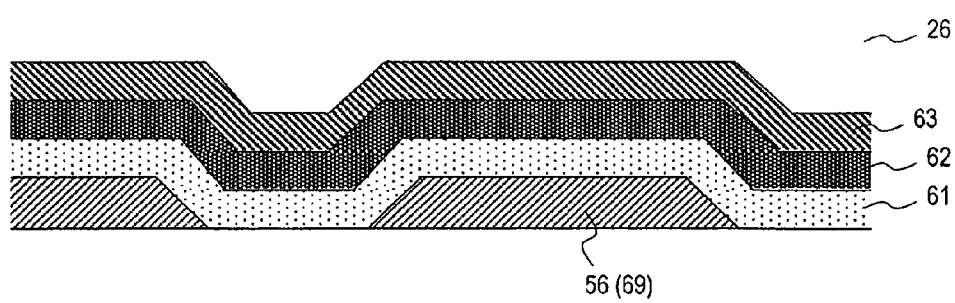
(d)
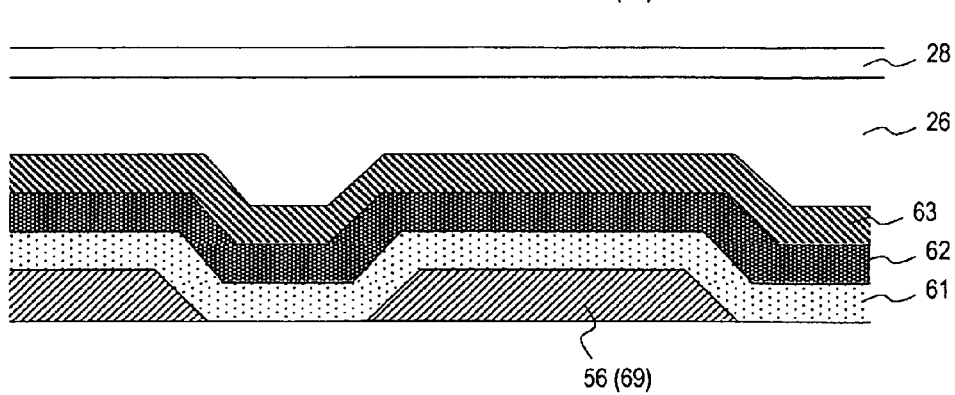
(e)

FIG.8
(a)
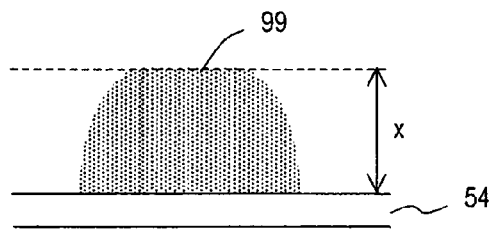
(b)
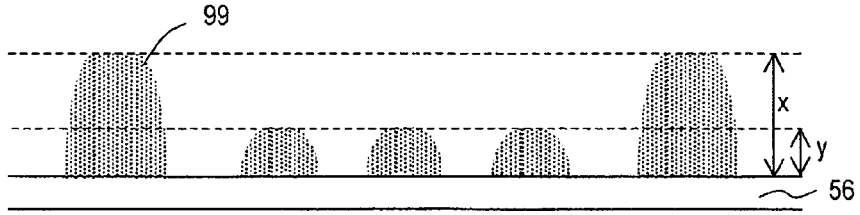

FIG.9
(a) 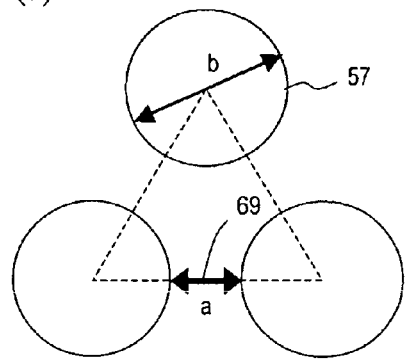
(b) 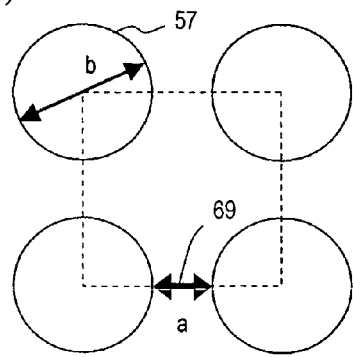
(c) 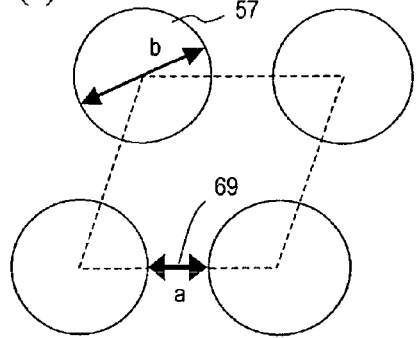
(d) 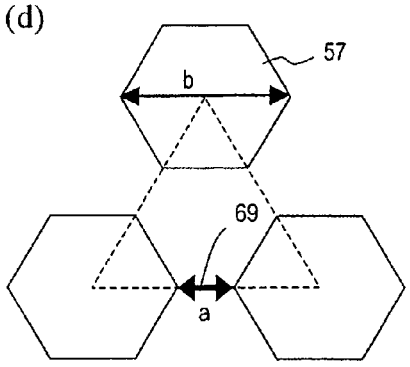
(e) 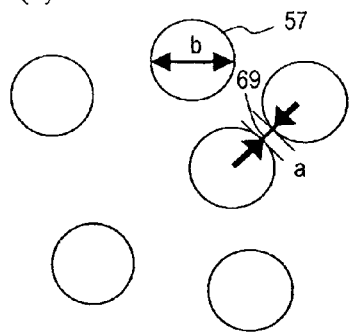

*FIG.11*
(a)
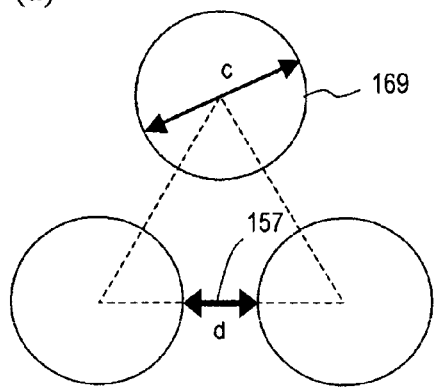
(b)
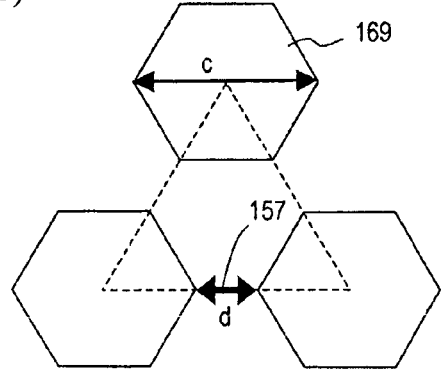
(c)
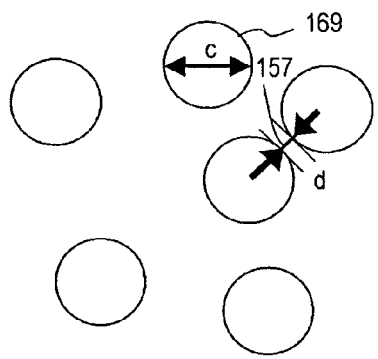
(d)
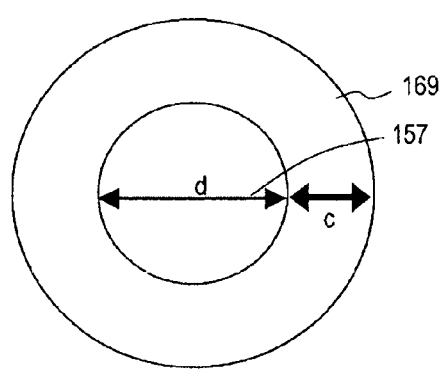
(e)
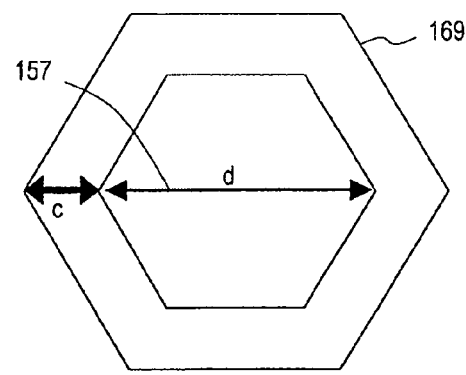
(f)
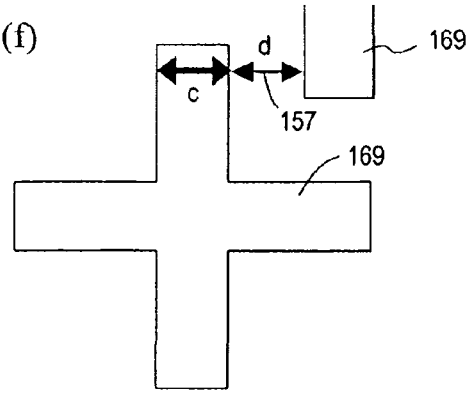

*FIG.12*
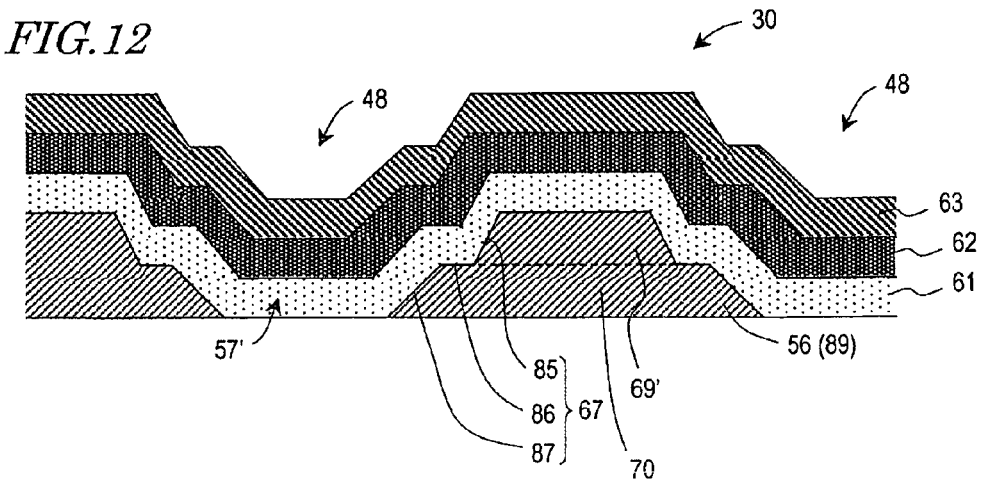
*FIG.13*
(a)
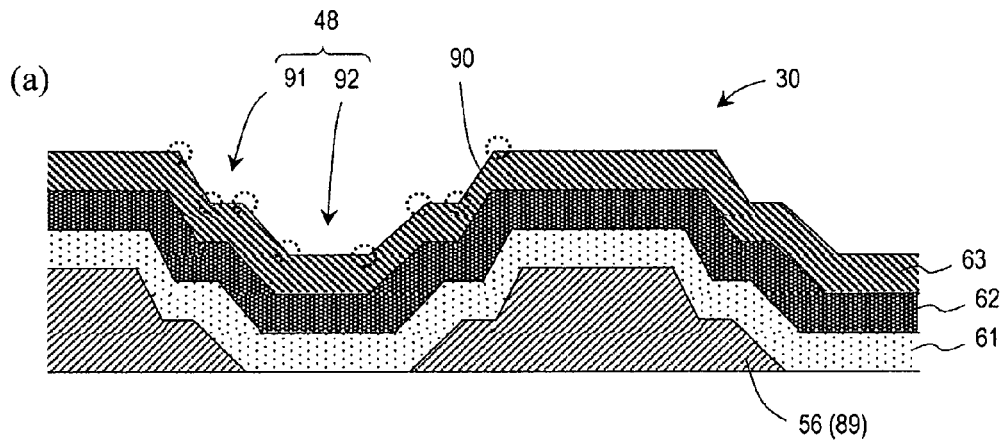
(b)
(c)
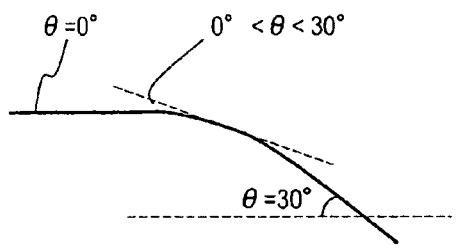

FIG.16
(a)
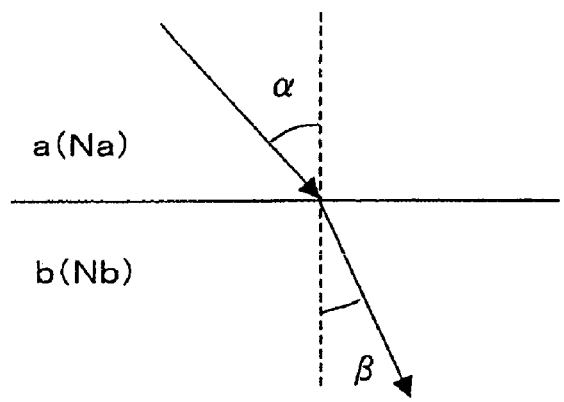
(b)
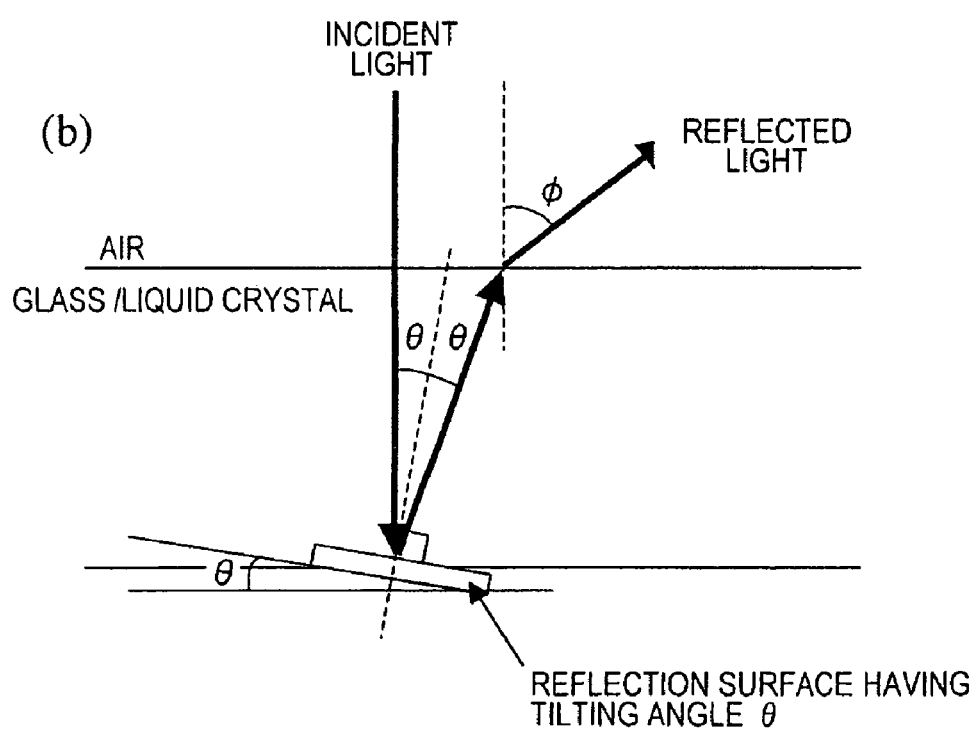

LIQUID CRYSTAL DISPLAY AND METHOD FOR MANUFACTURING LIQUID CRYSTAL DISPLAY

This application is the U.S. national phase of International Application No. PCT/JP2007/067511, filed 7 Sep. 2007, which designated the U.S. and claims priority to Japanese Patent Application No. 2006-284206, filed 18 Oct. 2006, the entire contents of each of which are hereby incorporated by reference.

TECHNICAL FIELD

The present invention relates to a reflection-type or transflective-type liquid crystal display device capable of performing display by utilizing reflected light.

BACKGROUND ART

Liquid crystal display devices include the transmission-type liquid crystal display device which utilizes backlight from behind the display panel as a light source for displaying, the reflection-type liquid crystal display device which utilizes reflected light of external light, and the transflective-type liquid crystal display device which utilizes both external light and backlight as light sources. The reflection-type liquid crystal display device and the transflective-type liquid crystal display device are characterized in that they have smaller power consumptions than that of the transmission-type liquid crystal display device, and their displayed images are easy to see in a bright place. The transflective-type liquid crystal display device is characterized in that the display is easier to see than that of the reflection-type liquid crystal display device, even in a dark place.

FIG. 15 is a cross-sectional view of an active matrix substrate 100 in a conventional reflection-type liquid crystal display device (e.g., Patent Document 1).

As show in FIG. 15, the active matrix substrate 100 includes an insulative substrate 101, as well as a gate layer 102, a gate insulating layer 104, a semiconductor layer 106, a metal layer 108, and a reflective layer 110, which are stacked on the insulative substrate 101. After being stacked on the insulative substrate 101, the gate layer 102, the gate insulating layer 104, the semiconductor layer 106, and a metal layer 108 are subjected to etching by using one mask, thus being formed so as to have an island-like multilayer structure. Thereafter, the reflective layer 110 is formed on this multilayer structure, whereby a reflective layer 112 having recesses/protrusions is formed. Although not shown, transparent electrodes, a liquid crystal layer, a color filter substrate (CF substrate), and the like are formed above the active matrix substrate 100.

[Patent Document 1] Japanese Laid-Open Patent Publication No. 9-54318

DISCLOSURE OF INVENTION

Problems to be Solved by the Invention

In the aforementioned active matrix substrate 100, portions of the reflective layer 110 are formed so as to reach the insulative substrate 101 in portions where a gate layer 102 and the like are not formed (i.e., portions between the islands, hereinafter referred to as "gap portions"). Therefore, in the gap portions, the surface of a reflection surface 112 is recessed in the direction of the insulative substrate 101, thus forming deep dents (or recesses).

In the reflection-type or transflective-type liquid crystal display device, in order to perform bright display by utilizing reflected light, it is necessary to allow incident light entering from various directions to be reflected by the reflection surface more uniformly and efficiently over the entire display surface. For this purpose, it is better if the reflection surface is not completely planar but has moderate recesses/protrusions.

However, since the reflection surface 112 of the aforementioned active matrix substrate 100 has deep dents, light is unlikely to reach the reflection surface located on the bottoms of the dents, and even if at all light reaches there, the reflected light thereof is unlikely to be reflected toward the liquid crystal panel. Therefore, the aforementioned conventional liquid crystal display device has a problem in that the reflected light is not effectively used for displaying. Furthermore, there is also a problem in that, since many portions of the reflection surface 110 have a large angle relative to the display surface of the liquid crystal display device, the reflected light from those portions is not effectively utilized for displaying.

FIG. 16 is a diagram showing a relationship between the tilt of the reflection surface 112 and reflected light. FIG. 16(a) shows a relationship between an incident angle α and an outgoing angle β when light enters a medium b having a refractive index Nb from a medium a having a refractive index Na. In this case, according to Snell's Law, the following relationship holds true.

$$Na \times \sin \alpha = Nb \times \sin \beta$$

FIG. 16(b) is a diagram showing a relationship between incident light and reflected light when incident light perpendicularly entering the display surface of an LCD is reflected from a reflection surface which is tilted by θ with respect to the display surface (or the substrate). As shown in the figure, the incident light perpendicularly entering the display surface is reflected from the reflection surface which is tilted by angle θ with respect to the display surface, and goes out in a direction of an outgoing angle φ.

According to Snell's Law, results of calculating the outgoing angle φ according to Snell's Law with respect to each angle θ of the reflection surface are shown in Table 1.

TABLE 1

| θ | φ | 90 − φ |
|---|---|--------|
| 0 | 0 | 90 |
| 2 | 6.006121 | 83.99388 |
| 4 | 12.04967 | 77.95033 |
| 6 | 18.17181 | 71.82819 |
| 8 | 24.42212 | 65.57788 |
| 10 | 30.86588 | 59.13412 |
| 12 | 37.59709 | 52.40291 |
| 14 | 44.76554 | 45.23446 |
| 16 | 52.64382 | 37.35618 |
| 18 | 61.84543 | 28.15457 |
| 20 | 74.61857 | 15.38143 |
| 20.5 | 79.76542 | 10.23458 |
| 20.6 | 81.12757 | 8.872432 |
| 20.7 | 82.73315 | 7.266848 |
| 20.8 | 84.80311 | 5.19888 |
| 20.9 | 88.85036 | 1.149637 |
| 20.905 | 89.79914 | 0.200856 |

The values in this Table are calculated by assuming that air has a refractive index of 1.0 and the glass substrate and the liquid crystal layer have a refractive index of 1.5. As shown in Table 1, when the angle θ of the reflection surface exceeds 20 degrees, the outgoing angle φ becomes very large (i.e., 90-φ becomes very small), so that most of the outgoing light does not reach the user. Therefore, even if recesses/protrusions are provided on the reflection surface of the reflective layer, it is necessary to ensure that the angle θ is 20 degrees or less in greater portions of the reflection surface in order to effectively use the reflected light.

Since the reflection surface 112 of the aforementioned active matrix substrate 100 has many portions in which the angle with respect to the display surface is greater than 20 degrees, reflected light is not very effectively used for displaying. In order to solve this problem, it might be possible to form an insulating layer under the reflective layer 110 so as to cover the metal layer 108, thus smoothing the reflection surface. However, this requires a step of forming an insulating layer, a step of forming contact holes for connecting the reflective layer 110 to the drains of TFTs in the insulating layer are needed, etc., thus resulting in a problem of an increase in the material and the number of steps.

In the manufacture of the conventional active matrix substrate 100, the gate layer 102, the gate insulating layer 104, a semiconductor layer 106 and the metal layer 108 are formed concurrently with and under the same conditions as the gate of the TFT, the insulating layer, the semiconductor layer and the source/drain electrode, respectively, and are thereafter etched together, and it is thus difficult to control the slope tilt, etc., of each layer. Therefore, it is difficult to give an intended tilt to the surface of the reflective layer so as to improve the reflection efficiency. Furthermore, if the width of the island-like multilayer structure is relatively large, there is formed a flat reflective layer 110 without recesses/protrusions on the multilayer structure, thereby lowering the efficiency in utilizing the reflected light.

The present invention has been made in view of the above problems, and an objective thereof is to provide a reflection-type liquid crystal display device and a transflective-type liquid crystal display device having a high image quality and including a reflection region having a high reflectivity.

Means for Solving the Problems

A liquid crystal display device of the present invention is a liquid crystal display device comprising a reflection region for reflecting incident light toward a display surface, wherein the reflection region includes a metal layer, an insulating layer formed on the metal layer, a semiconductor layer formed on the insulating layer, and a reflective layer formed on the semiconductor layer; a plurality of recesses are formed in at least one of the metal layer, the insulating layer and the semiconductor layer; a plurality of dents are formed in the reflective layer in the reflection region according to the plurality of recesses; and a shortest distance between edge portions of at least two of the plurality of recesses is 4 µm or less.

In one embodiment, the shortest distance between edge portions of at least two recesses is 1 µm or more. In one embodiment, a maximum width of at least one of the plurality of recesses is 15 µm or less. In one embodiment, the maximum width of at least one recess is 2 µm or more. In one embodiment, a shortest distance between an edge portion of any one of the plurality of recesses and an edge portion of another recess located closest thereto is 4 µm or less.

Another liquid crystal display device of the present invention is a liquid crystal display device comprising a reflection region for reflecting incident light toward a display surface, wherein the reflection region includes a metal layer, an insulating layer formed on the metal layer, a semiconductor layer formed on the insulating layer, and a reflective layer formed on the semiconductor layer; a plurality of protrusions are formed in at least one of the metal layer, the insulating layer and the semiconductor layer; a plurality of projections are formed in the reflective layer in the reflection region according to the plurality of protrusions; and a maximum width of at least one of the plurality of protrusions is 5 µm or less.

In one embodiment, the maximum width of at least one protrusion is 2 µm or more. In one embodiment, a shortest distance between edge portions of at least two of the plurality of protrusions is 15 µm or less. In one embodiment, the shortest distance between edge portions of at least two protrusions is 3 µm or more. In one embodiment, a shortest distance between an edge portion of any one of the plurality of protrusions and an edge portion of another protrusion located closest thereto is 15 µm or less.

A method for manufacturing a liquid crystal display device of the present invention is a method for manufacturing a liquid crystal display device having a reflection region for reflecting incident light toward a display surface, comprising: a step of forming a metal layer on a substrate; a step of forming an insulating layer on the metal layer; step of forming a semiconductor layer on the insulating layer; and a step of forming a reflective layer on the semiconductor layer, wherein a plurality of recesses are formed in at least one of the metal layer, the insulating layer and the semiconductor layer; in the step of forming a reflective layer, a plurality of dents are formed in the reflective layer in the reflection region according to the plurality of recesses; and a shortest distance between edge portions of at least two of the plurality of recesses is 4 µm or less.

In one embodiment, the shortest distance between edge portions of at least two recesses is 1 µm or more. In one embodiment, a maximum width of at least one of the plurality of recesses is 15 µm or less. In one embodiment, the maximum width of at least one recess is 2 µm or more. In one embodiment, a shortest distance between an edge portion of any one of the plurality of recesses and an edge portion of another recess located closest thereto is 4 µm or less.

In one embodiment, in the step of forming a metal layer, photolithography technique is used to form the plurality of recesses in the metal layer and form at least one of a gate bus line and a storage capacitor line; and a thickness of a resist film used for forming the plurality of recesses is smaller than that of a resist film used for forming at least one of the gate bus line and the storage capacitor line.

Another method for manufacturing a liquid crystal display device of the present invention is a method for manufacturing a liquid crystal display device having a reflection region for reflecting incident light toward a display surface, comprising: a step of forming a metal layer on a substrate; a step of forming an insulating layer on the metal layer; a step of forming a semiconductor layer on the insulating layer; and a step of forming a reflective layer on the semiconductor layer, wherein a plurality of protrusions are formed in at least one of the metal layer, the insulating layer and the semiconductor layer; in the step of forming a reflective layer, a plurality of projections are formed in the reflective layer in the reflection region according to the plurality of protrusions; and a maximum width of at least one of the plurality of protrusions is 5 µm or less.

In one embodiment, the maximum width of at least one protrusion is 2 µm or more. In one embodiment, a shortest distance between edge portions of at least two of the plurality of protrusions is 15 µm or less. In one embodiment, the shortest distance between edge portions of at least two protrusions is 3 µm or more. In one embodiment, a shortest distance between an edge portion of any one of the plurality of protrusions and an edge portion of another protrusion located closest thereto is 15 µm or less.

In one embodiment, in the step of forming a metal layer, photolithography technique is used to form the plurality of protrusions in the metal layer and form at least one of a gate bus line and a storage capacitor line; and a thickness of a resist film used for forming the plurality of protrusions is smaller than that of a resist film used for forming at least one of the gate bus line and the storage capacitor line.

Another liquid crystal display device of the present invention is a liquid crystal display device comprising a reflection region for reflecting incident light toward a display surface, wherein the reflection region includes a metal layer, an insulating layer formed on the metal layer, a reflective layer formed on the insulating layer; a plurality of recesses are formed in at least one of the metal layer and the insulating layer; a plurality of dents are formed in the reflective layer in the reflection region according to the plurality of recesses; and a shortest distance between edge portions of at least two of the plurality of recesses is 4 µm or less.

Another liquid crystal display device of the present invention is a liquid crystal display device comprising a reflection region for reflecting incident light toward a display surface, wherein the reflection region includes a metal layer, an insulating layer formed on the metal layer, a reflective layer formed on the insulating layer; a plurality of protrusions are formed in at least one of the metal layer and the insulating layer; a plurality of projections are formed in the reflective layer in the reflection region according to the plurality of protrusions; and a maximum width of at least one of the plurality of protrusions is 5 µm or less.

Another method for manufacturing a liquid crystal display device of the present invention is a method for manufacturing a liquid crystal display device having a reflection region for reflecting incident light toward a display surface, comprising: a step of forming a metal layer on a substrate; a step of forming an insulating layer on the metal layer; and a step of forming a reflective layer on the insulating layer, wherein a plurality of recesses are formed in at least one of the metal layer and the insulating layer; in the step of forming a reflective layer, a plurality of dents are formed in the reflective layer in the reflection region according to the plurality of recesses; and a shortest distance between edge portions of at least two of the plurality of recesses is 4 µm or less.

Another method for manufacturing a liquid crystal display device of the present invention is a method for manufacturing a liquid crystal display device having a reflection region for reflecting incident light toward a display surface, comprising: a step of forming a metal layer on a substrate; a step of forming an insulating layer on the metal layer; and a step of forming a reflective layer on the insulating layer, wherein a plurality of protrusions are formed in at least one of the metal layer and the insulating layer; in the step of forming a reflective layer, a plurality of projections are formed in the reflective layer in the reflection region according to the plurality of protrusions; and a maximum width of at least one of the plurality of protrusions is 5 µm or less.

Effects of the Invention

According to the present invention, it is possible to provide a reflection-type liquid crystal display device and a transflective-type liquid crystal display device having a high image quality and including a reflection region having a high reflectivity.

BRIEF DESCRIPTION OF DRAWINGS

[FIG. 2] Diagrams specifically illustrating the construction of a pixel region and a reflection section of Embodiment 1, where (a) is a plan view showing a portion of a pixel region as viewed from above the display surface, and (b) is a plan view schematically showing the construction of a reflection section of a liquid crystal display device.

[FIG. 3] Cross-sectional views showing the construction of a reflection section and a TFT section of Embodiment 1, where (a) shows the construction of a reflection section, and (b) shows the construction of a TFT section.

[FIG. 5] Cross-sectional views showing a method for manufacturing a TFT section of Embodiment 1.

[FIG. 7] Cross-sectional views showing a method for manufacturing a reflection section of Embodiment 1.

[FIG. 8] Cross-sectional views showing a method for shaping a gate line, a gate electrode, a Cs line and a Cs metal layer of Embodiment 1.

[FIG. 9] Diagrams showing examples of shapes and arrangements of recesses 57 of Embodiment 1.

[FIG. 11] Diagrams showing examples of shapes and arrangements of protrusions 169 of Embodiment 2.

[FIG. 12] A cross-sectional view the showing construction of a reflection section of Embodiment 3.

[FIG. 13] Schematic diagrams for comparison between the construction of a reflection section of Embodiment 3 and that of a conventional liquid crystal display device, where (a) shows a cross section of the reflection section, (b) shows a cross section of the reflection section of the conventional liquid crystal display device, and (c) shows surface angles at a corner portion of the reflection section.

[FIG. 16] Diagrams showing a relationship between a tilt of a reflection surface and reflected light in a liquid crystal display device, where (a) shows a relationship between an incident angle α and an outgoing angle β when light enters a medium b having a refractive index Nb from a medium a having a refractive index Na, and (b) shows a relationship between incident light and reflected light as well as the angle of the display surface of the LCD.

Figure 1:
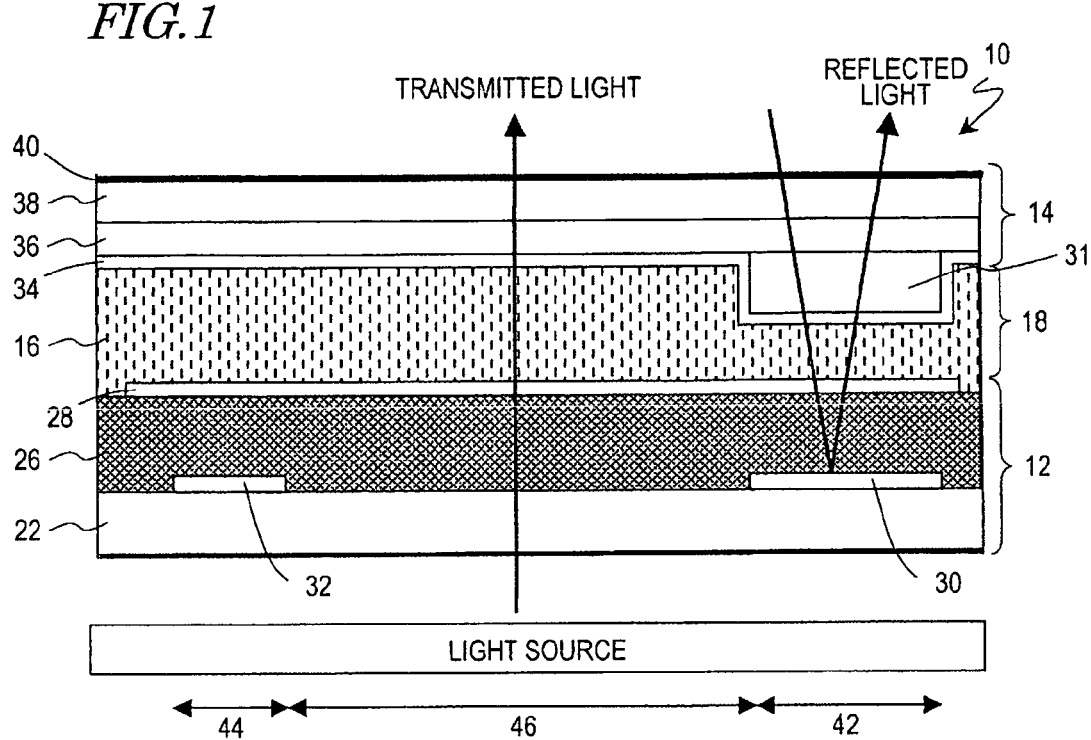
[FIG. 1] A diagram schematically showing a cross-sectional shape of the liquid crystal display device according to Embodiment 1 of the present invention.

DESCRIPTION OF THE REFERENCE NUMERALS 10 liquid crystal display device
12 TFT substrate
14 counter substrate
16 liquid crystal
18 liquid crystal layer
22 transparent substrate
26 interlayer insulating layer
28 pixel electrode
30 reflection section
31 layer
32 TFT section
34 counter electrode
36 CF layer
38 transparent substrate
40 display surface 42 reflection region
44 TFT region
46 transmission region
48 recess
48' protrusion
50 pixel
52 source line
54 gate line
56 Cs line
57 recess
58 contact hole
61 gate insulating layer
62 semiconductor layer
63 reflective layer
67 slope
69 protrusion
69' upper portion
70 lower portion
85 upper slope
86 flat portion
87 lower slope
90 slope
91, 92 recess
99 photoresist
148, 157 recess
169 protrusion

BEST MODE FOR CARRYING OUT THE INVENTION

Embodiment 1

Hereinafter, with reference to the drawing, a first embodiment of the liquid crystal display device according to the present invention will be described.

FIG. 1 schematically shows a cross-sectional structure of a liquid crystal display device 10 of the present embodiment. The liquid crystal display device 10 of the present embodiment is a transflective-type liquid crystal display device by an active matrix method. As shown in FIG. 1, the liquid crystal display device 10 includes a TFT (Thin Film Transistor) substrate 12, a counter substrate 14, and a liquid crystal layer 18 containing liquid crystal 16 which is sealed between the TFT substrate 12 and the counter substrate 14.

The TFT substrate 12 comprises a transparent substrate 22, an interlayer insulating layer 26, and a pixel electrode 28, and includes reflection sections 30 and TFT sections 32. Gate lines (scanning lines), source lines (signal lines), and Cs lines (storage capacitor electrode lines), etc., are formed on the TFT substrate 12, which will be described later.

The counter substrate 14 is a color filter substrate (CF substrate), for example, and includes a counter electrode 34, a color filter layer (CF layer) 36, and a transparent substrate 38. The upper face of the transparent substrate 38 serves as a display surface 40 of the liquid crystal display device. Note that although the TFT substrate 12 and the counter substrate 14 each have an alignment film and a polarizer, they are omitted from the figure.

In the liquid crystal display device 10, a region where a reflection section 30 is formed is referred to as a reflection region 42, whereas a region where a TFT section 32 is formed is referred to as a TFT region 44. In the reflection region 42, light entering from the display surface 40 is reflected by the reflection section 30, and travels through the liquid crystal layer 18 and the counter substrate 14 so as to go out from the display surface 40. The liquid crystal display device 10 further has transmission regions 46 which are formed in regions other than the reflection regions 42 and the TFT regions 44. In the transmission regions 46, light which is emitted from a light source in the display device 10 travels through the TFT substrate 12, the liquid crystal layer 18, and the counter substrate 14 so as to go out from the display surface 40.

Note that, as shown in FIG. 1, a layer 31 which is composed of a transmissive resin or the like is provided at the counter substrate 14 side above each reflection section 30, and the thickness of the liquid crystal layer 18 in the reflection region 42 is a half of the thickness of the liquid crystal layer 18 in the transmission region 46. As a result, the optical path length (the distance over which light travels through the liquid crystal layer 18) in the reflection region 42 and that in the transmission region 46 are equal to each other. Although FIG. 1 illustrates the layer 31 as being formed between the counter electrode 34 and the CF layer 36, the layer 31 may be formed on the face of the counter electrode 34 facing the liquid crystal layer 18.

FIG. 2 is a plan view more specifically showing the construction of the pixel region and the reflection section 30 in the liquid crystal display device 10.

FIG. 2(a) is a plan view of a portion of a pixel region of the liquid crystal display device 10, as seen from above the display surface 40. As shown in the figure, a plurality of pixels 50 (rectangular portions denoted by bold lines) are provided in a matrix shape on the liquid crystal display device 10. The aforementioned reflection section 30 and TFT section 32 are formed in each pixel 50.

In the border of the pixel 50, source lines 52 extend along the column direction (the vertical direction in the figure), and gate lines (gate metal layers) 54 extend along the row direction (the horizontal direction in the figure). In the central portion of the pixel 50, a Cs line (Cs metal layer) 56 extends along the row direction. In the interlayer insulating layer 26 of the reflection section 30, a contact hole 58 for connecting the pixel electrode 28 and the drain electrode of the TFT is formed. The Cs line 56, paired with the pixel electrode, forms a storage capacitor.

FIG. 2(b) is a plan view schematically showing the construction of the reflection section 30 above the Cs line 56. The contact hole 58 shown in FIG. 2(a) is omitted from this figure. As shown in the figure, a plurality of circular recesses (dents) 48 are formed in the reflection section 30. As will be described later, a reflective layer is formed in an upper portion of the reflection section 30, and the surface of the recesses 48 is formed as the surface of the reflective layer. The reflective layer is connected to the drain electrode of the TFT in the TFT section 32. Thus, by forming many recesses 48 in the reflection section 30, the angle θ can be made 20 degrees or less in greater portions of the reflection surface. Therefore, it is possible to improve the reflection efficiency in the reflection section.

Although only eight recesses 48 are shown in the figure for a better understanding of the construction, the number of the recesses 48 is not limited to eight, but there may be more recesses 48. The recesses 48 do not have to be arranged regularly in the vertical and horizontal direction as shown in the figure, but may be arranged randomly or with irregular spacing. According to the present embodiment, many recesses 48 can be formed as closely together as possible by a method to be described later.

Next, referring to FIG. 3, the construction of the reflection section 30 and the TFT section 32 will described in greater detail.

FIG. 3(a) shows a cross section of the reflection section 30 (a cross section of a portion shown by arrow C in FIG. 2(b)). As shown in the figure, the Cs metal layer (metal layer) 56, a gate insulating layer 61, a semiconductor layer 62, and a reflective layer 63 are stacked in the reflection section 30. The semiconductor layer 62 includes an intrinsic amorphous silicon layer (Si(i) layer), and an n+ amorphous silicon layer (Si(n+) layer) doped with phosphorus.

The Cs metal layer 56 in the reflection section 30 includes recesses (or openings) 57 formed therein as-shown in the figure, and protrusions 69 of the Cs metal layer 56 are formed between the recesses 57. The recesses 48 of the reflective layer 63 are formed according to the shape of the recesses 57 of the Cs metal layer 56. The semiconductor layer 62 may possibly be absent in the reflection section 30.

FIG. 3(b) is a cross-sectional view showing the construction of the gate metal layer (metal layer) 54, the gate insulating layer 61, the semiconductor layer 62, and the reflective layer 63 in the TFT section 32. The gate metal layer 54 in the TFT section 32 is formed concurrently with and from the same member as the Cs metal layer 56 of the reflection section 30. Similarly, gate insulating layer 61, the semiconductor layer 62, and the reflective layer 63 of the TFT section 32 are formed concurrently with and from the same members as the gate insulating layer 61, the semiconductor layer 62, and the reflective layer 63 of the reflection section 30, respectively.

In FIG. 3(a), a denotes the interval between two recesses 57 of the Cs metal layer 56. In the present embodiment, the interval a between the recesses 57 means the shortest distance between edge portions of two adjacent recesses 57 (the recess edges at the upper surface of the Cs metal layer 56). In order to enhance the reflection efficiency in the reflection section 30, it is better to provide more recesses 48 on the surface of the reflective layer 63. This is because it is then possible to form more surfaces where the tilt is 20 degrees or less on the surface of the reflective layer 63. For this, it is necessary to provide more recesses 57 also in the Cs metal layer 56. Thus, in the present embodiment, the interval a is set to 4 μm or, less, and the maximum width b of the recess 57 (the maximum width of the opening on the upper surface of the Cs metal layer 56) is set to 15 μm or less. The lower limit of the interval a is set to 1 μm in view of the limitations of the manufacture process, and the lower limit of the width b is set to 2 μm for the same reason. That is, a preferred predetermined range of the interval a is 1 μm or more and 4 μm or less, and the predetermined range of the width b is 2 μm or more and 15 μm or less.

In order to improve the reflection efficiency, it is preferred that the interval a between any two recesses 57 adjacent to each other is within the aforementioned predetermined range. Nevertheless, the present invention is not limited to this, and the reflection efficiency can also be improved by setting the interval a between a recess 57 and another recess 57 located closest thereto to a value within the predetermined range. The reflection efficiency can also be improved by setting the interval a between a recess and another recess located closest thereto to a value within the predetermined range for 50% or more of the recesses 57 formed in the reflection section 30. The reflection efficiency can also be improved by setting the interval a between at least two recesses 57 in the reflection section 30 to a value within the predetermined range.

In order to improve the reflection efficiency, it is preferred that the width b of all the recesses 57 is within the aforementioned predetermined range. Nevertheless, the present invention is not limited to this, and the reflection efficiency can also be improved by setting the width b within the predetermined range for 50% or more of the recesses 57 formed in the reflection section 30. The reflection efficiency can also be improved by setting the width b to a value within the predetermined range for at least one recess 57 in the reflection section 30.

Figure 15:
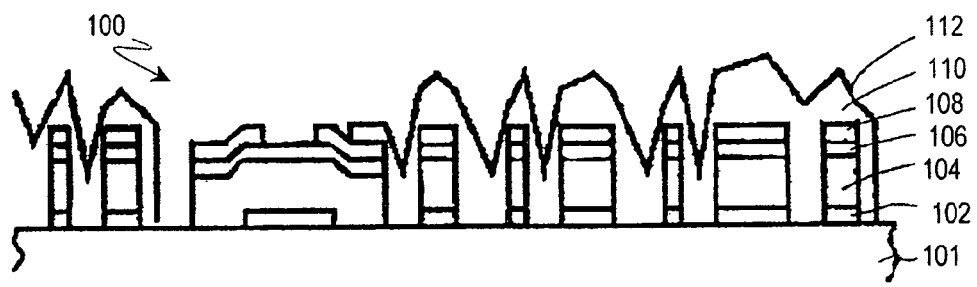
[FIG. 15] A cross-sectional view showing an active matrix substrate in a conventional reflection-type LCD.

In the conventional liquid crystal display device shown in FIG. 15, recesses are formed in portions where the gate layer 102, the gate insulating layer 104 and the semiconductor layer 106 have been removed, and the bottom surfaces of the recesses are therefore formed at deep positions. Therefore, the inner surface of each recess has a large tilt angle, thus making it difficult to form within the recess a large number of effective reflection surfaces having a tilt of 20 degrees or less. Moreover, these recesses are formed by forming the gate layer 102, the gate insulating layer 104, and the semiconductor layer 106, and then removing these layers altogether. Thus, it is not possible to control the shape of the inner surface of each recess and the tilt angle of the slope, making it difficult to increase the effective reflection surfaces.

According to the present embodiment, the recesses 48 (dents) of the reflective layer 63 are formed according to the controlled shape of the Cs metal layer 56, and it is therefore possible to easily form relatively shallow dents in the reflective layer. Therefore, the reflection efficiency at the surface of the reflective layer is improved. Since the shape, the depth, the slope tilt angle, etc., of the recesses 48 can easily be adjusted, the recesses 48 of the reflective layer 63 can easily be formed with a slope tilt angle of 20 degrees or less. Therefore, it is possible to increase the area of the effective reflection surface without increasing the manufacturing cost.

According to the present embodiment, the interval between the recesses 57 in the Cs metal layer 56 can be set to be as small as practically possible. The width of the recesses 57 themselves can also be made as small as possible. Then, more recesses 57 of the Cs metal layer 56 can be arranged in the reflection section 30, thus forming more recesses 48 in the reflective layer 63. This increases the area of the surface where the tilt is 20 degrees or less on the surface of the reflective layer 63, thereby improving the reflection efficiency. Furthermore, since it is possible to reduce the area of the flat portion of the surface of the reflective layer 63, it is possible to further improve the reflection efficiency.

Next, a method for manufacturing the TFT substrate 12 according to the present embodiment will be described.

Figure 4:
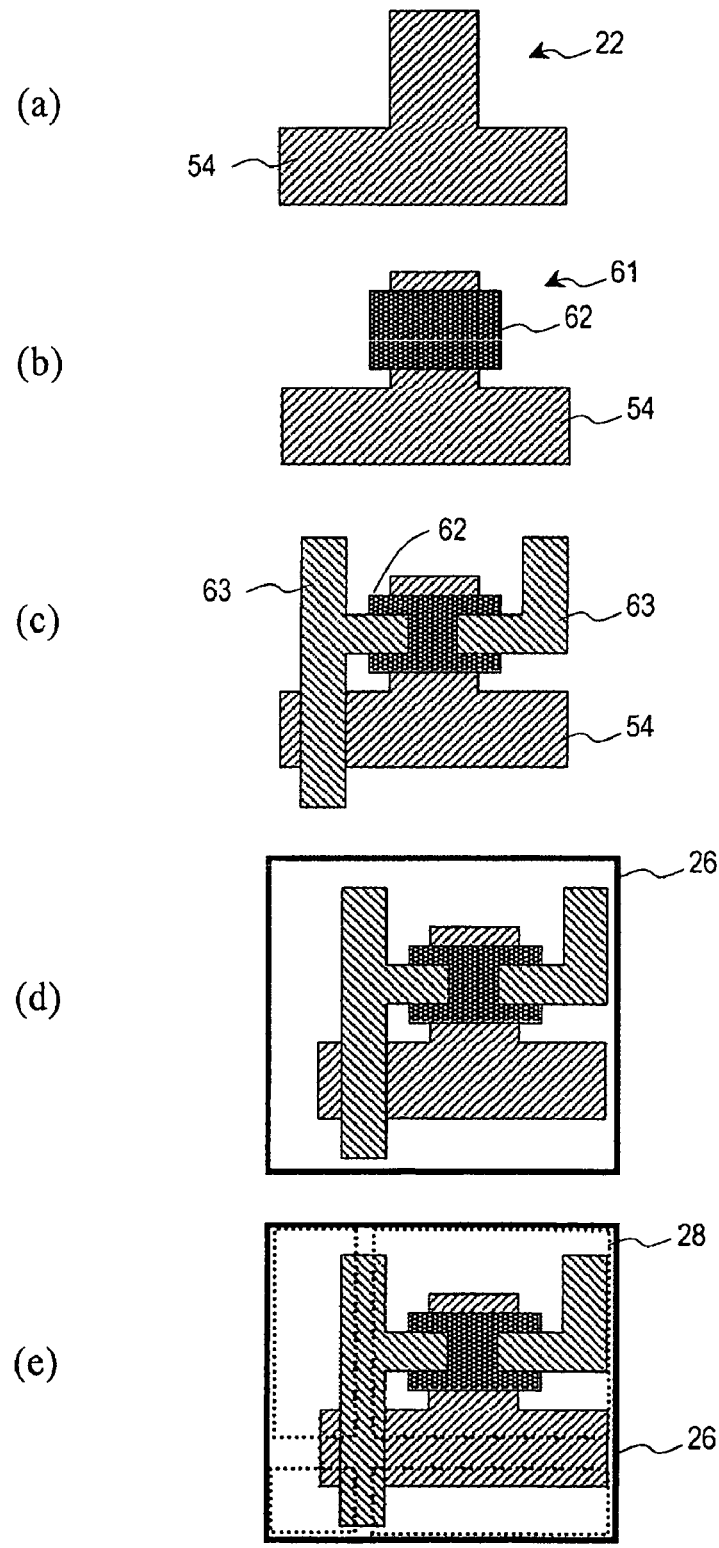
[FIG. 4] Plan views showing a method for manufacturing a TFT section of Embodiment 1.

FIG. 4 is plan views showing a method for manufacturing the TFT substrate 12 in the TFT section 32. FIG. 5 is cross-sectional views showing a method for manufacturing the TFT substrate 12 in the TFT section 32, showing a cross section of a portion shown by arrow A in FIG. 2(a).

As shown in FIG. 4(a) and FIG. 5(a), first, by a method such as sputtering, a thin metal film of Al (aluminum) is formed on the transparent substrate 22 having been cleaned. Note that, other than Al, this thin metal film may be formed by using Ti (titanium), Cr (chromium), Mo (molybdenum), Ta (tantalum), W (tungsten), or an alloy thereof, etc., or formed from a multilayer body of a layer of such materials and a nitride film.

Thereafter, a resist film is formed on the thin metal film, and after forming a resist pattern through an exposure and development step, a dry or wet etching is performed to form the gate metal layer 54 (including the gate electrode and the gate line). The gate metal layer 54 has a thickness of 200 to 500 nm, for example.

Thus, the gate metal layer 54 which is formed by photolithography technique serves as a gate electrode of the TFT. Note that, in this step, the gate lines (gate metal layer) 54 shown in FIG. 2(a) and the Cs metal layer 56 of the reflection section 30 shown in FIG. 3(a) are also formed from the same metal concurrently.

Next, as shown in FIG. 4(b) and FIG. 5(b), by using P-CVD technique and a gaseous mixture of $SiH_4$, $NH_3$, and $N_2$, the gate insulating layer 61 composed of SiN (silicon nitride) is formed across the entire substrate surface. The gate insulating layer 61 may also be composed of $SiO_2$ (silicon oxide), $Ta_2O_5$ (tantalum oxide), $Al_2O_3$ (aluminum oxide), or the like. The thickness of the gate insulating layer 61 is 300 to 500 nm, for example. In this step, the gate insulating layer 61 of the reflection section 30 shown in FIG. 3(*a*) is also formed concurrently.

Next, on the gate insulating layer 61, an amorphous silicon (a-Si) (Si(i) film) film and an n⁺a-Si film (Si (n⁺) film) obtained by doping amorphous silicon with phosphorus (P). The thickness of the a-Si film is 30 to 300 nm, for example, and the thickness of the n⁺a-Si film is 20 to 100 nm, for example. Thereafter, these films are shaped by photolithography technique, whereby the semiconductor layer 62 is formed. In this step, the semiconductor layer 62 of the reflection section 30 shown in FIG. 3(*a*) is also formed concurrently.

Next, as shown in FIG. 4(*c*) and FIG. 5(*c*), a thin metal film of Al or the like is formed across the entire substrate surface by sputtering technique or the like, and a photolithography technique is performed to form the reflective layer 63. For the thin metal film, the materials which are mentioned above as materials for the gate metal layer 54 may be used. The thickness of the reflective layer 63 is 30 to 1000 nm, for example. In the TFT section 32, the reflective layer 63 forms a source electrode and a drain electrode of the TFT. At this time, the source line 52 in FIG. 2(*a*) is also formed as a portion of the reflective layer 63, and the reflective layer 63 of the reflection section 30 shown in FIG. 3(*a*) is also formed concurrently.

Next, as shown in FIG. 4(*d*) and FIG. 5(*d*), a photosensitive acrylic resin is applied by spin-coating, whereby the interlayer insulating layer (interlayer resin layer) 26 is formed. The thickness of the interlayer insulating layer 26 is 0.3 to 5 μm, for example. Although a thin film such as $SiN_x$ or $SiO_2$ may be formed by P-CVD technique as a protection film between the reflective layer 63 and the interlayer insulating layer 26, such is omitted from the figure. The thickness of the protection film is 50 to 1000 nm, for example. The interlayer insulating layer 26 and the protection film are formed not only on the TFT section 32, but also on the entire upper surface of the transparent substrate 22 including the reflection section 30.

Next, as shown in FIG. 4(*e*) and FIG. 5(*e*), on the interlayer insulating layer 26, a transparent electrode film such as ITO or IZO is formed by sputtering technique or the like. This transparent electrode film is pattern shaped by photolithography technique, whereby the pixel electrode 28 is formed. The pixel electrode 28 is formed not only on the TFT section 32 but also on the entire upper surface of the pixel including the reflection section 30.

Next, by using FIG. 6 and FIG. 9, a method for manufacturing the TFT substrate 12 in the reflection section 30 will be described.

Figure 6:
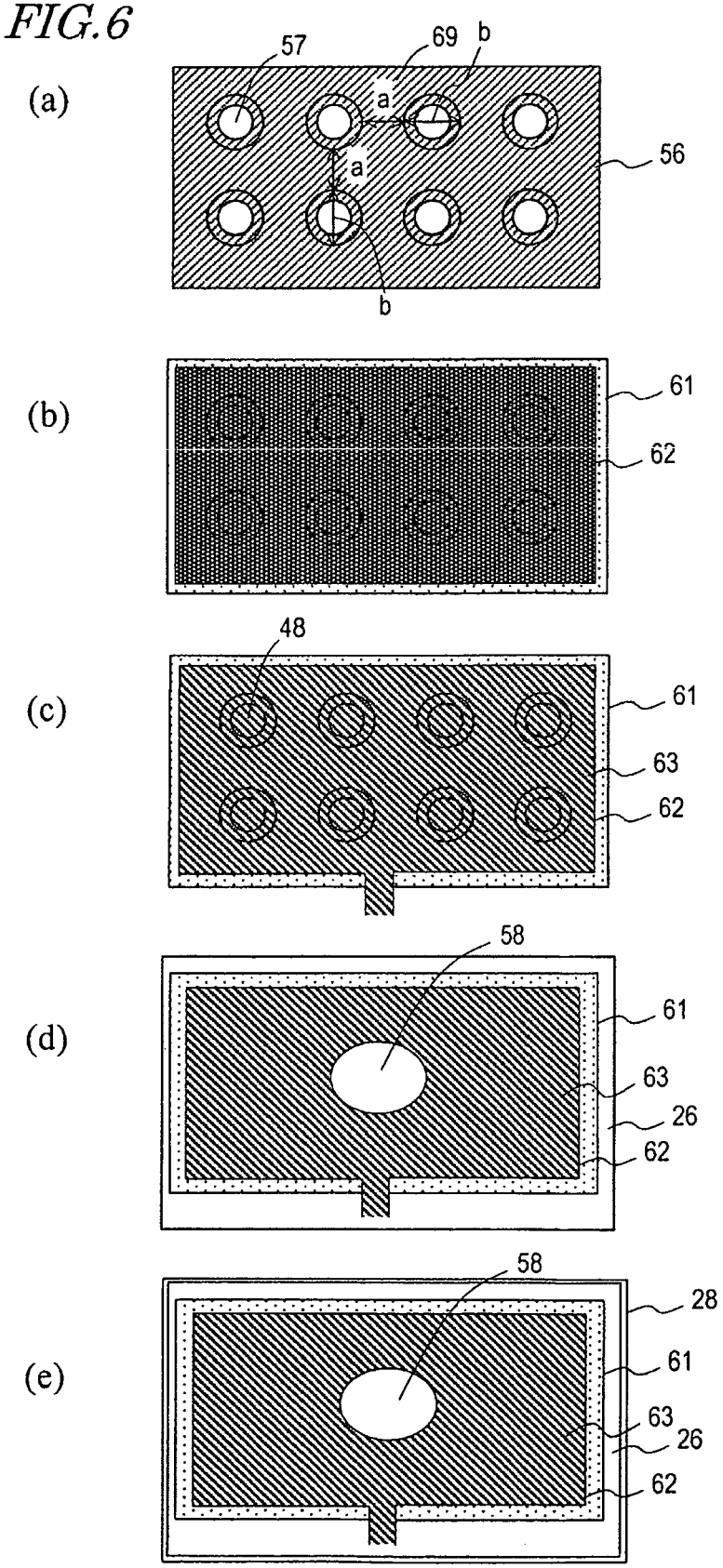
[FIG. 6] Plan views showing a method for manufacturing a reflection section of Embodiment 1.

FIG. 6 is a plan view showing a method for manufacturing the TFT substrate 12 in the reflection section 30. FIG. 7 is a cross-sectional view showing a method for manufacturing the TFT substrate 12 in the reflection section 30, showing a cross section of a portion shown by arrow C in FIG. 2(*b*). She steps shown at (a) to (e) in FIG. 6 and FIG. 7 correspond to the steps of (a) to (e) in FIG. 4 and FIG. 5, respectively.

As shown in FIG. 6(*a*) and FIG. 7(*a*), the Cs metal layer 56 in the reflection section 30 is formed, by a similar method, concurrently with and from the same metal as the gate metal layer 54 in the TFT section 32. When the thin metal film is shaped by photolithography technique, a plurality of recesses 57 are formed in the Cs metal layer 56 according to the openings of the photoresist so that the interval a between two recesses 57 and the width b of each recess 57 are within the aforementioned predetermined ranges. A more specific method for forming the recesses 57 will be described later.

Next, as shown in FIG. 6(*b*) and FIG. 7(*b*), the gate insulating layer 61 is formed by a method similar to that for the TFT section 32, and thereafter the semiconductor layer 62 is formed. While the semiconductor layer 62 is formed in the TFT section 32, the semiconductor layer 62 may possibly be absent in the reflection section 30 by, for example, removing the semiconductor material in the patterning process.

Next, As shown in FIG. 6(*c*) and FIG. 7(*c*), the reflective layer 63 is formed on the semiconductor layer 62 (on the gate insulating layer 61 if the semiconductor layer 62 is not formed) by a method similar to that for the TFT section 32. On the surface of the reflective layer 63, the recesses 48 are formed, reflecting the recesses 57 and the protrusions 69 of the Cs metal layer 56.

Next, as shown in FIG. 6(*d*) and FIG. 7(*d*), the interlayer insulating layer 26 is formed from photosensitive acrylic resin. Thereafter, through a development process using an exposure apparatus, the contact hole 58 is formed near the center of the reflection section 30.

Next, as shown in FIG. 6(*e*) and FIG. 7(*e*), the pixel electrode 28 is formed. In the reflection section 30, the pixel electrode 28 is formed above the interlayer insulating layer 26 and the contact hole 58, such that the metal member of the pixel electrode 28 is in contact with the reflective layer 63 via the contact hole 58. As a result, the drain electrode of the TFT in the TFT section 32 is electrically connected with the pixel electrode 28 via the contact hole 58.

Next, using FIG. 8, a method for manufacturing the Cs metal layer 56 of the present embodiment, the gate line (gate bus line) 54, and the gate electrode in the TFT section will be described in greater detail.

FIG. 8(*a*) is a diagram showing the shape of a photoresist 99 used when forming the gate line 54, showing the cross-sectional shape at the position shown by arrow B in FIG. 2(*a*). FIG. 8(*b*) is a diagram showing the shape of the photoresist 99 used when forming the Cs metal layer 56 in the reflection section 30, showing the cross-sectional shape at the position shown by arrow D in FIG. 2(*c*).

As described above, when forming the Cs metal layer 56, the gate electrode and the gate line 54 in the TFT section 32 are also formed concurrently and from the same metal by photolithography technique. While a photoresist having a height x is used as shown in FIG. 8(*a*) when shaping the gate line (and the gate electrode) 54, a photoresist having a height y shallower than x is used when shaping the Cs metal layer 56 in the reflection section 30. The photoresist is uniformly deposited with the height x across the substrate surface including the TFT section 32 and the reflection section 30, and then exposure conditions and baking conditions, for example, are appropriately set in the reflection section 30 so that the film has the height y at its top.

Thus, since the thickness of the resist film used in the formation of the recesses 57 is thinner than that of the resist film used in the formation of the gate line 54, a gentle slope is formed at the edge portion of the recess 57 in the film-shaping process by etching, whereas a steep slope is formed at the edge portion of the gate line 54. As shown in FIG. 8(*b*), for the Cs metal layer 56 outside the reflection section 30, the photoresist 99 having the height x is used, and therefore the slope at the edge portion of the Cs line 56 is also a steep slope.

Using such a method, it is readily possible, by the same photolithography step, to form the recess 57 with a gentle slope of 20° or less, for example, and to shape the gate line 54 and the Cs line 56 with a high process precision. Moreover, since it is possible to easily control the size, shape and slope tilt of the recesses 57 and the interval between the recesses 57, it is possible to obtain intended recesses 57 without increasing the number of steps. Thus, it is possible to efficiently manufacture a liquid crystal display device having a high reflectivity in which the reflective layer 63 has many surfaces where the tilt is 20° or less.

Next, using FIG. 9, a variation of the shape and the arrangement method of the recesses 57 will be described.

(a) to (e) of FIG. 9 each show an example of the edge shape and the arrangement of the recesses 57 as viewed in a direction vertical to the substrate surface. The recesses 57 may be formed in a circular shape as shown in (a) to (c) and (e) of FIG. 9, or in a hexagonal shape as shown in FIG. 9(d). The shape of the recess 57 is not limited to those illustrated herein, but elliptic shapes, polygonal shapes, or other shapes, may be used. The arrangement of the recesses 57 may be a regular arrangement as shown in FIGS. 9(a) to (d), or may be an irregular or random arrangement as shown in FIG. 9(e). In any case, the interval a between the recesses 57 is defined as the shortest distance between the edge portions of two adjacent recesses 57, and the width b of a recess 57 is defined as the maximum width between edge portions of the recess 57.

Although the recesses 57 are described as being formed in the Cs metal layer (metal layer) 56 in the embodiment above, the recesses 57 may be formed in the gate insulating layer 61 or the semiconductor layer 62 in the reflection section 30, or may be formed in two or all of these layers. Furthermore, the recesses 57 may be provided in one or two of these layers, with protrusions as will be described in Embodiment 2 being formed in one or two other layers thereof. The semiconductor layer 62 may be absent in the reflection section 30. The recesses 57 may be formed by the aforementioned photolithography technique, or the like, during the formation of the layers. The embodiments of the present invention are deemed to encompass these examples.

Embodiment 2

Next, using FIGS. 10 and 11, a second embodiment of the liquid crystal display device of the present invention will be described. The second embodiment is directed to the liquid crystal display device 10 shown in FIG. 1, except that the reflection section 30 shown in FIG. 3(a) is replaced by that shown in FIG. 10. Otherwise, the construction is the same as that of Embodiment 1, and only what are different from Embodiment 1 will be described. Like elements to those of Embodiment 1 will be denoted by like reference numerals and will not be described below.

Figure 10:
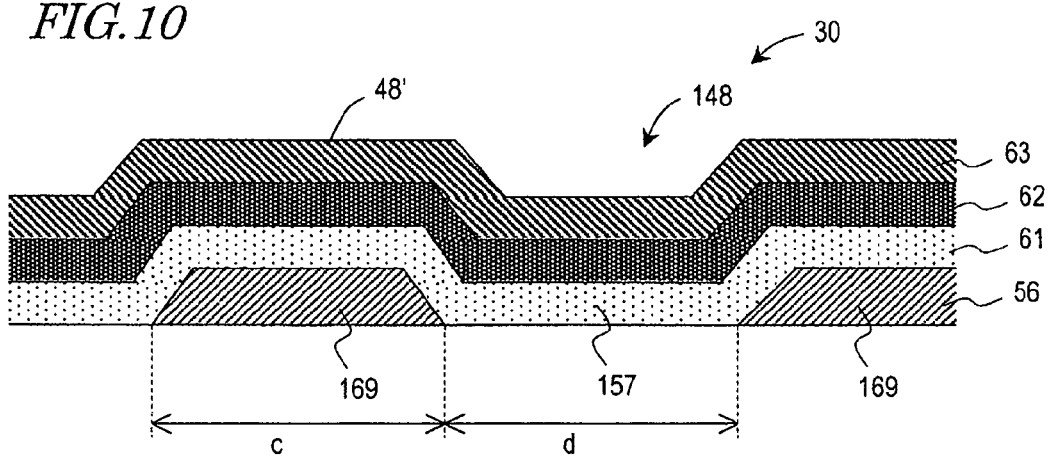
[FIG. 10] A cross-sectional view showing the construction of a reflection section of Embodiment 2.

FIG. 10 shows a cross section of the reflection section 30 of Embodiment 2 (a cross section of a portion shown by arrow C in FIG. 2(b)). In the reflection section 30 shown in FIG. 10, the recess 48 shown in FIG. 2(b) corresponds to a protrusion (projection) 48'. That is, the recess/protrusion pattern on the surface of the reflection section 30 in Embodiment 1 is reversed from that of Embodiment 2 so that the recess 48 shown as a circular recess in FIG. 3(a) is the protrusion 48' in Embodiment 2.

A plurality of protrusions 169 are formed in the Cs metal layer 56 in the reflection section 30 as shown in the figure, and a recess 157 of the Cs metal layer 56 is formed between two protrusions 169. The protrusion 48' of the reflective layer 63 is formed according to the shape of the protrusion 169 of the Cs metal layer 56.

In FIG. 10, c denotes the width of the protrusion 169. The maximum width c means the maximum width of the protrusion 169 at the bottom surface of the Cs metal layer 56. Moreover, d denotes the interval between two protrusions 169 of the Cs metal layer 56. The interval d denotes the shortest distance between edge portions of two adjacent protrusions 169 (the edges of the protrusions 169 at the lower surface of the Cs metal layer 56). In order to enhance the reflection efficiency in the reflection section 30, it is better to provide more protrusions 48' and recesses 148 on the surface of the reflective layer 63. This is because it is then possible to form more surfaces where the tilt is 20 degrees or less on the surface of the reflective layer 63 For this, it is necessary to provide more protrusions 169 and recesses 157 also in the Cs metal layer 56. Thus, in the present embodiment, the width c of the protrusion 169 is set to 5 μm or less, and the interval d is set to 15 μm or less. The lower limit of the width c is set to 2 μm in view of the limitations of the manufacture process, and the lower limit of the interval d is set to 2 μm for the same reason. That is, a preferred predetermined range of the width c is 2 μm or more and 5 μm or less, and the predetermined range of the interval d is 2 μm or more and 15 μm or less.

In order to improve the reflection efficiency, it is preferred that the interval d between any two protrusions 169 adjacent to each other is within the aforementioned predetermined range. Nevertheless, the present invention is not limited to this, and the reflection efficiency can also be improved by setting the interval d between a protrusion 169 and another protrusion 169 located closest thereto to a value within the predetermined range. The reflection efficiency can also be improved by setting the interval d between a protrusion and another protrusion located closest thereto to a value within the aforementioned predetermined range for 50% or more of the protrusions 169 formed in the reflection section 30. The reflection efficiency can also be improved by setting the interval d between at least two protrusions 169 in the reflection section 30 to a value within the predetermined range.

In order to improve the reflection efficiency, it is preferred that the width c of all the protrusions 169 is within the aforementioned predetermined range. Nevertheless, the present invention is not limited to this, and the reflection efficiency can also be improved by setting the width c within the aforementioned predetermined range for 50% or more of the protrusions 169 formed in the reflection section 30. The reflection efficiency can also be improved by setting the width c to a value within the predetermined range for at least one protrusion 169 in the reflection section 30.

The aforementioned Cs metal layer 56 can be formed by a method similar to that described in Embodiment 1. Note however that when shaping the Cs metal layer 56, a mask having a pattern obtained by inverting the pattern used in Embodiment 1 is used as a resist mask. Therefore, the recesses 57 are formed by a so-called "negative-type pattern" in Embodiment 1, whereas the protrusions 169 are formed by a "positive-type pattern" in Embodiment 2.

Next, using FIG. 11, a variation of the shape and the arrangement of the protrusions 169 will be described.

(a) to (f) of FIG. 11 each show an example of the edge shape and the arrangement of the protrusions 169 as viewed in a direction vertical to the substrate surface. The protrusions 169 may be formed in a circular shape as shown in (a) and (c) of FIG. 11, or may be formed in a hexagonal shape as shown in (b). Moreover, the protrusion 169 may be in a circular shape or a hexagonal shape having a recess therein as shown in (d) and (e), or may be in a cross shape as shown in (f). The shape of the protrusion 169 is not limited to those illustrated herein, but elliptic shapes, polygonal shape shapes, or other shapes, may be used. The arrangement of the protrusions 169 may be a regular arrangement as shown in (a) and (b), or may be an irregular or random arrangement as shown in (c). In any case, the width c of a protrusion 169 is defined as the maximum width of the protrusion 169, and the interval d is defined as the shortest distance between the edge portions of two adjacent protrusions 169. In a case where the protrusion 169 extends in a line pattern as shown in (d) to (f), the width c thereof is defined as the maximum width of the line portion.

According to the present embodiment, the protrusions 48' (projections) of the reflective layer 63 are formed according to the controlled shape of the Cs metal layer 56, and it is therefore possible to easily form relatively low projections on the reflective layer. Therefore, the reflection efficiency at the surface of the reflective layer is improved. Since the shape, the height, the slope tilt angle, etc., of the protrusions 48' can easily be adjusted, it is easy to form many slopes where the tilt angle is 20 degrees or less on the surface of the reflective layer 63. Therefore, it is possible to increase the area of the effective reflection surface without increasing the manufacturing cost.

According to the present embodiment, the width and the interval of the protrusion 169 in the Cs metal layer 56 can be set to be as small as practically possible. Then, more protrusions 169 of the Cs metal layer 56 can be arranged in the reflection section 30, thus forming more protrusions 48' in the reflective layer 63. This increases the area of the surface where the tilt is 20 degrees or less on the surface of the reflective layer 63, thereby improving the reflection efficiency. Furthermore, since it is possible to reduce the area of the flat portion of the surface of the reflective layer 63, it is possible to further improve the reflection efficiency.

Although the protrusions 169 are described as being formed in the Cs metal layer (metal layer) 56 in the embodiment above, such protrusions may be formed in the gate insulating layer 61 or the semiconductor layer 62 in the reflection section 30, or may be formed in two or all of these layers.

Furthermore, the protrusions 169 may be provided in one or two of these layers, with recesses as described in Embodiment 1 being formed in one or two other layers thereof. The semiconductor layer 62 may be absent in the reflection section 30. The protrusions 169 may be formed by the aforementioned photolithography technique, or the like, during the formation of the layers. The embodiments of the present invention are deemed to encompass these examples.

Embodiment 3

Next, a third embodiment of the liquid crystal display device of the present invention will be described. The third embodiment is directed to the liquid crystal display device 10 shown in FIG. 1, except that the reflection section 30 shown in FIG. 3(*a*) is replaced by that shown in FIG. 12. Otherwise, the construction is the same as that of Embodiment 1, and only what are different from Embodiment 1 of the reflection section 30 will be described. Like elements to those of Embodiments 1 and 2 will be denoted by like reference numerals and will not be described below.

FIG. 12 shows a cross section of the recess 48 in the reflection section 30 of Embodiment 3 (a cross section of a portion shown by arrow C in FIG. 2(*b*)). As shown in the figure, the Cs metal layer (metal layer) 56, the gate insulating layer 61, the semiconductor layer 62 and the reflective layer 63 are stacked in the reflection section 30.

A plurality of recesses (or openings) 57' are formed in the Cs metal layer 56 in the reflection section 30 as shown in the figure, and a protruding portion 89 of the Cs metal layer 56 is formed between the recesses 57'. A slope 67 of the protruding portion 89 is formed with a step, and the slope 67 includes an upper slope 85, a flat portion 86 and a lower slope 87. The flat portion 86 is formed generally parallel to the substrate surface. A portion of the protruding portion 89 that is above a plane that includes the flat portion 86 is referred to as an upper portion 69', and a portion below the plane is referred to as a lower portion 70. The recesses 48 of the reflective layer 63 are formed according to the shape of the recesses 57' of the Cs metal layer 56.

A reflection section 30' may be manufactured by a method similar to that described above using FIGS. 6 to 8. The interval a shown in Embodiment 1 is the shortest distance between edge portions of uppermost portions of two recesses 57', and the width b is the maximum width between edge portions of the uppermost portion of the recess 57'. One may consider that the interval a is the shortest distance between edge portions of the recesses 57' on a plane that includes the flat portion 86, and the width b is the maximum width between edge portions of the recess 57' on the same plane. The Cs metal layer 56 having a shape obtained by inverting the recess/protrusion pattern of Embodiment 3 may be used. A construction obtained by forming a step as shown in the present embodiment in the recesses and the protrusions of the Cs metal layer 56 of Embodiments 1 and 2 is also included in embodiments the present invention. Furthermore, a construction obtained by providing recesses in one or two of the Cs metal layer 56, the gate insulating layer 61 and the semiconductor layer 62, and a construction obtained by providing protrusions in one or two of these layers with recesses provided in one or two other layers thereof, are also included in embodiments of the present invention. A construction where the semiconductor layer is not provided in the reflection section 30' is also included in embodiments of the present invention.

According to the present embodiment, there is obtained an advantage as follows, in addition to those described in Embodiments 1 and 2.

FIG. 13 shows diagrams for comparison between the construction of the reflection section 30 of the present embodiment and that of the reflection section of the conventional liquid crystal display device shown in FIG. 15. FIG. 13(*a*) schematically shows a cross-sectional structure of the reflection section 30 of the present embodiment, and FIG. 13(*b*) schematically shows a cross-sectional structure of the reflection section of the conventional liquid crystal display device. As shown in these figures, on the surface of the reflective layer 63 of the present embodiment, there is formed a stepped slope 90, reflecting the slope of the protruding portion 89 of the Cs metal layer 56. Thus, a recess 91 and a recess 92 located inside the recess 91 are formed in the reflective layer 63. The recess 48 shown in FIG. 2(*b*) is formed by the recess 91 and the recess 92.

As seen in a cross-sectional shape, each recess 48 includes eight corner portions (portions shown by dotted lines in the figure). In the conventional liquid crystal display device, each recess includes only four corner portions as shown in FIG. 13(*b*). At the corner portions of the reflective layer, surfaces having an angle greater than 20 degrees with respect to the substrate from the plane parallel to the substrate (represented as being 30 degrees, for example, in this figure) are formed continuously as shown in FIG. 13(*c*). Therefore, if more recesses are formed in the reflection section, it is possible to form more effective reflection surfaces (surfaces whose angle with respect to the substrate is 20 degrees or less) on the surface of the reflective layer 63.

As can be seen from FIGS. 13(*a*) and (*b*), a two-tiered recess having a step therein is formed in the reflective layer 63 of the present embodiment. Therefore, the surface of the reflective layer 63 has more corner portions than the conventional reflection section. Thus, more effective reflection surfaces are formed on the surface of the reflective layer 63, and it is therefore possible to improve the reflection efficiency of the reflection section 30. Since the recesses 91 and the recesses 92 are formed according to the controlled shape of the Cs metal layer 56, the shape, the depth and the slope tilt angle of the recesses can easily be adjusted.

Although the protruding portion 89 of the Cs metal layer 56 has a two-tiered structure including the upper portion 69' and the lower portion 70 in the present embodiment, the protruding portion 89 may be formed with three or more tiers of steps. In this case, a recess is further formed inside the recess 92 formed in the reflective layer 63, and it is therefore possible to obtain an even higher reflection efficiency.

In the embodiment above, the recess 91 and the recess 92 formed on the surface of the reflective layer 63 are assumed to be formed concentrically as viewed in a direction vertical to the substrate. Nevertheless, the present invention is not limited to this, and the recess 91 and the recess 92 may be arranged so that their centers are not aligned with each other. The periphery of the recess 91 and that of the recess 92 may partially overlap each other. Also in these cases, many recesses/protrusions with steps are formed on the surface of the reflective layer 63, whereby it is possible to widen the effective reflection surface.

Embodiment 4

Hereinafter, with reference to the drawing, a fourth embodiment of the liquid crystal display device according to the present invention will be described. Like elements to those of Embodiments 1 to 3 will be denoted by like reference numerals and will not be described below.

Figure 14:
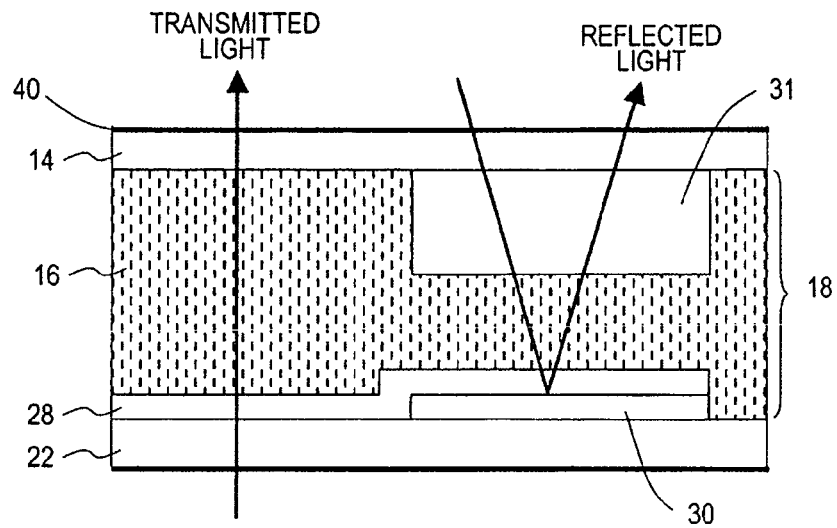
[FIG. 14] A cross-sectional view showing a liquid crystal display device of Embodiment 4.

FIG. 14 schematically shows a cross-sectional shape of the liquid crystal display device of the present embodiment. This liquid crystal display device is based on the liquid crystal display devices of Embodiments 1 to 3 from which the interlayer insulating layer 26 is excluded, and is identical to the liquid crystal display devices of Embodiments 1 to 3 except for the points discussed below. Note that, in FIG. 14, the detailed structure of the counter substrate 14 and the TFT section 32 are omitted illustration.

As shown in the figure, in the present embodiment, the interlayer insulating layer is not formed, and therefore the pixel electrode 28 is formed upon the reflective layer 63 in the reflection section 30 and in the TFT section 32, via an insulating film not shown. The structure and the manufacturing method for the reflection section 30 and the TFT section 32 are the same as in Embodiment 1 except that the interlayer insulating layer 26 is eliminated. The pixel layout and wiring structure in the liquid crystal display device are also similar to what is shown in FIG. 2(a).

Also with this construction, as in Embodiments 1 to 3, the effective reflection surfaces of the reflective layer 63 are expanded in area, so that more light can be reflected toward the display surface 40.

Although the recesses 57 of the Cs metal layer 56 are formed in a circular shape in the embodiment above, the recesses 57 may be formed in any of various shapes, including elliptic shapes, polygonal shapes such as triangles and quadrangles, with sawtoothed edges, or combinations thereof.

The liquid crystal display device of the present invention encompasses display apparatuses, television sets, mobile phones, etc., in which a liquid crystal panel is utilized. Moreover, although the present embodiments illustrate transflective-type liquid crystal display devices as examples, a reflection-type liquid crystal display device having a similar configuration to the aforementioned reflection section would also be encompassed as one configuration of the present invention.

Moreover, since the liquid crystal display device according to the present invention is formed by the above-described manufacturing methods, it can be manufactured with the same materials and steps as those for a transmission-type liquid crystal display device. Therefore, at low cost, a liquid crystal display device having a high reflection efficiency can be provided.

INDUSTRIAL APPLICABILITY

According to the present invention, type and reflection-type liquid crystal display devices having a high image quality can be provided at low cost. Liquid crystal display devices according to the present invention can be suitably used for transflective-type and reflection-type liquid crystal display devices which perform display by utilizing reflected light, e.g., mobile phones, onboard display device such as car navigation systems, display devices of ATMs and vending machines, etc., portable display devices, laptop PCs, and the like.

The invention claimed is:

1. A method for manufacturing a liquid crystal display device having a reflection region for reflecting incident light toward a display surface, comprising:
a step of forming a metal layer on a substrate;
a step of forming an insulating layer on the metal layer;
a step of forming a semiconductor layer on the insulating layer; and
a step of forming a reflective layer on the semiconductor layer, wherein
a plurality of recesses are formed in at least one of the metal layer, the insulating layer and the semiconductor layer;
in the step of forming a reflective layer, a plurality of dents are formed in the reflective layer in the reflection region according to the plurality of recesses;
a shortest distance between edge portions of at least two of the plurality of recesses is 4 µm or less;
wherein:
in the step of forming a metal layer, photolithography technique is used to form the plurality of recesses in the metal layer and form at least one of a gate bus line and a storage capacitor line; and
a thickness of a resist film used for forming the plurality of recesses is smaller than that of a resist film used for forming at least one of the gate bus line and the storage capacitor line.

2. The manufacturing method of claim 1, wherein the shortest distance between edge portions of at least two recesses is 1 µm or more.

3. The manufacturing method of claim 1, wherein a maximum width of at least one of the plurality of recesses is 15 µm or less.

4. The manufacturing method of claim 3, wherein the maximum width of at least one recess is 2 µm or more.

5. The manufacturing method of claim 1, wherein a shortest distance between an edge portion of any one of the plurality of recesses and an edge portion of another recess located closest thereto is 4 µm or less.

6. A method for manufacturing a liquid crystal display device having a reflection region for reflecting incident light toward a display surface, comprising:
a step of forming a metal layer on a substrate;
a step of forming an insulating layer on the metal layer;

a step of forming a semiconductor layer on the insulating layer; and a step of forming a reflective layer on the semiconductor layer, wherein a plurality of protrusions are formed in at least one of the metal layer, the insulating layer and the semiconductor layer;

in the step of forming a reflective layer, a plurality of projections are formed in the reflective layer in the reflection region according to the plurality of protrusions;

a maximum width of at least one of the plurality of protrusions is 5 μm or less;

wherein:

in the step of forming a metal layer, photolithography technique is used to form the plurality of protrusions in the metal layer and form at least one of a gate bus line and a storage capacitor line; and a thickness of a resist film used for forming the plurality of protrusions is smaller than that of a resist film used for forming at least one of the gate bus line and the storage capacitor line.

7. The manufacturing method of claim 6, wherein the maximum width of at least one protrusion is 2 μm or more.

8. The manufacturing method of claim 6, wherein a shortest distance between edge portions of at least two of the plurality of protrusions is 15 μm or less.

9. The manufacturing method of claim 8, wherein the shortest distance between edge portions of at least two protrusions is 3 μm or more.

10. The manufacturing method of claim 6, wherein a shortest distance between an edge portion of any one of the plurality of protrusions and an edge portion of another protrusion located closest thereto is 15 μm or less.

* * * * *